United States Patent
Suito et al.

(10) Patent No.: US 10,894,902 B2
(45) Date of Patent: *Jan. 19, 2021

(54) ADHESIVE TAPE CARTRIDGE AND ADHESIVE TAPE ROLL

(71) Applicant: BROTHER KOGYO KABUSHIKI KAISHA, Nagoya (JP)

(72) Inventors: Yoshikatsu Suito, Nagoya (JP); Chisato Yoshimura, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/367,445

(22) Filed: Mar. 28, 2019

(65) Prior Publication Data

US 2019/0218421 A1    Jul. 18, 2019

Related U.S. Application Data

(63) Continuation of application No. PCT/JP2017/033738, filed on Sep. 19, 2017.

(30) Foreign Application Priority Data

Sep. 30, 2016    (JP) .................. 2016-195295

(51) Int. Cl.
*B41J 3/36*      (2006.01)
*C09J 7/20*      (2018.01)
(Continued)

(52) U.S. Cl.
CPC . *C09J 7/20* (2018.01); *B41J 3/36* (2013.01); *B41J 17/32* (2013.01); *C09J 7/30* (2018.01);
(Continued)

(58) Field of Classification Search
CPC ............. B41J 32/00; B41J 3/36; B41J 3/4075
See application file for complete search history.

(56) References Cited

U.S. PATENT DOCUMENTS

2007/0147937 A1    6/2007    Hioki et al.
2008/0026205 A1    1/2008    Sasaki et al.
(Continued)

FOREIGN PATENT DOCUMENTS

EP    0 644 063 A2    3/1995
JP    S58-101051 A    6/1983
(Continued)

OTHER PUBLICATIONS

English translation of International Preliminary Report on Patentability dated Apr. 11, 2019, together with the Written Opinion received in related International Application No. PCT/JP2017/033738.

(Continued)

*Primary Examiner* — Kristal Feggins
(74) *Attorney, Agent, or Firm* — Scully, Scott, Murphy & Presser, P.C.

(57) ABSTRACT

The disclosure discloses an adhesive tape cartridge including an adhesive tape roll. The adhesive tape roll winds an adhesive tape around a predetermined axis in a housing. The adhesive tape includes a base layer, a colored layer, and a pigment-containing adhesive layer. The colored layer is disposed on a first side of the base layer in a thickness direction and comprises a pigment added thereto. The pigment-containing adhesive layer is disposed on the first side of the colored layer in the thickness direction and comprises an adhesive to which a pigment is added.

16 Claims, 31 Drawing Sheets

(51) Int. Cl.
*B41J 17/32* (2006.01)
*C09J 11/00* (2006.01)
*C09J 7/30* (2018.01)
*C09J 201/00* (2006.01)
*C09J 11/04* (2006.01)
*B41J 3/407* (2006.01)

(52) U.S. Cl.
CPC ............ *C09J 11/00* (2013.01); *C09J 11/04* (2013.01); *C09J 201/00* (2013.01); *B41J 3/4075* (2013.01)

(56) References Cited

U.S. PATENT DOCUMENTS

| | | | |
|---|---|---|---|
| 2013/0021423 A1 | 1/2013 | Tonishi | |
| 2014/0210935 A1 | 7/2014 | Norimatsu et al. | |
| 2016/0289031 A1 | 10/2016 | Norimatsu et al. | |

FOREIGN PATENT DOCUMENTS

| | | | |
|---|---|---|---|
| JP | S58-101176 A | 6/1983 |
| JP | 2000-006481 A | 1/2000 |
| JP | 2003-195768 A | 7/2003 |
| JP | 2006-181932 A | 7/2006 |
| JP | 2007-176013 A | 7/2007 |
| JP | 2008-063435 A | 3/2008 |
| JP | 2013-082789 A | 5/2013 |
| JP | 2015-067642 A | 4/2015 |
| JP | 2016-190956 A | 11/2016 |

OTHER PUBLICATIONS

International Search Report dated Oct. 31, 2017 issued in PCT/JP2017/033738.
Japanese Office Action dated Oct. 1, 2019 in Japanese Patent Application No. 2016-195295.
Japanese Notice of Reasons for Refusal dated Mar. 9, 2020 received in Japanese Patent Application No. 2016-195295, together with an English-language translation.
Partial Supplementary European Search Report dated Sep. 4, 2020 received in European Application No. 17 85 5830.0.
Extended Supplementary European Search Report dated Nov. 20, 2020 received in European Application No. 17 85 5830.0.

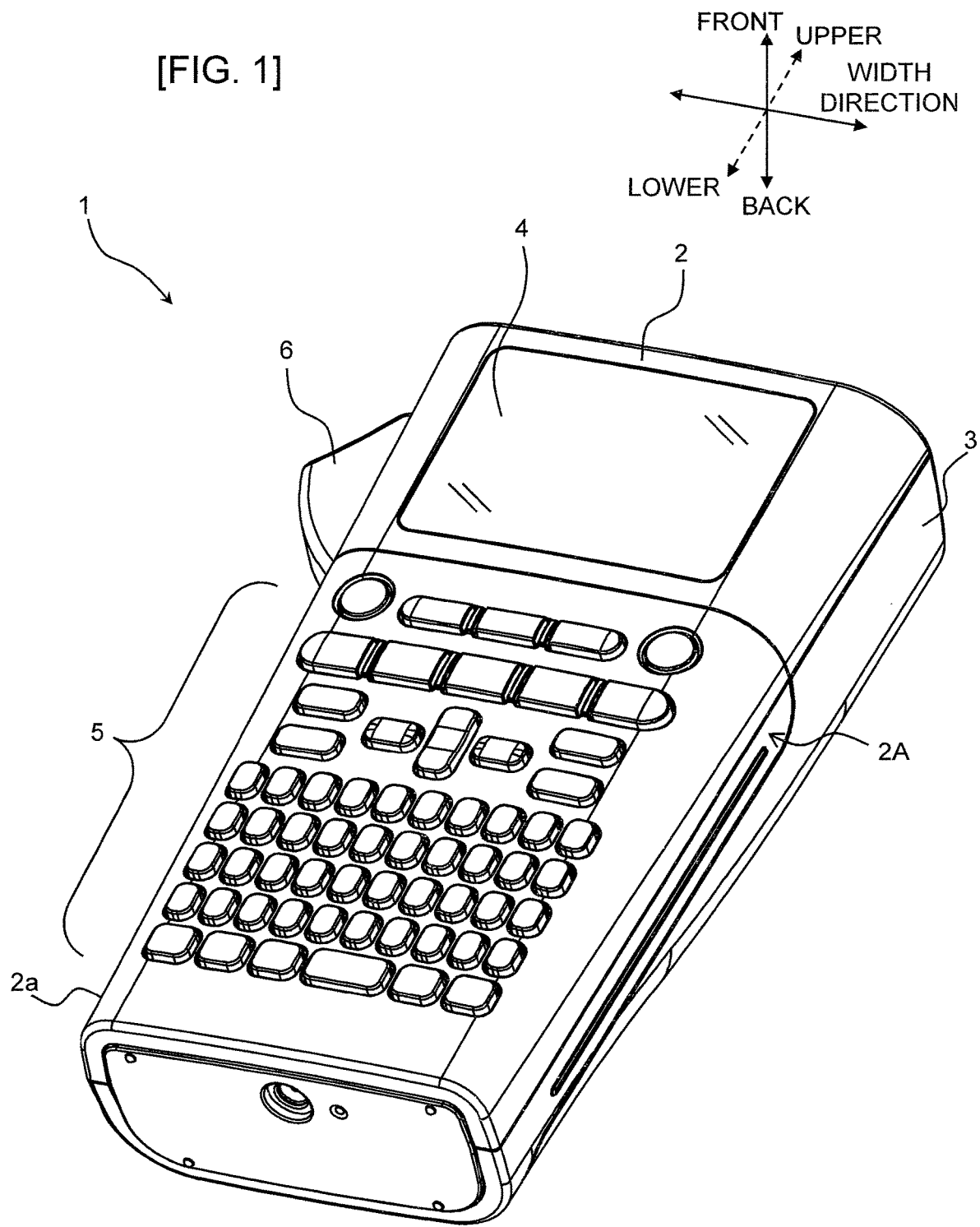

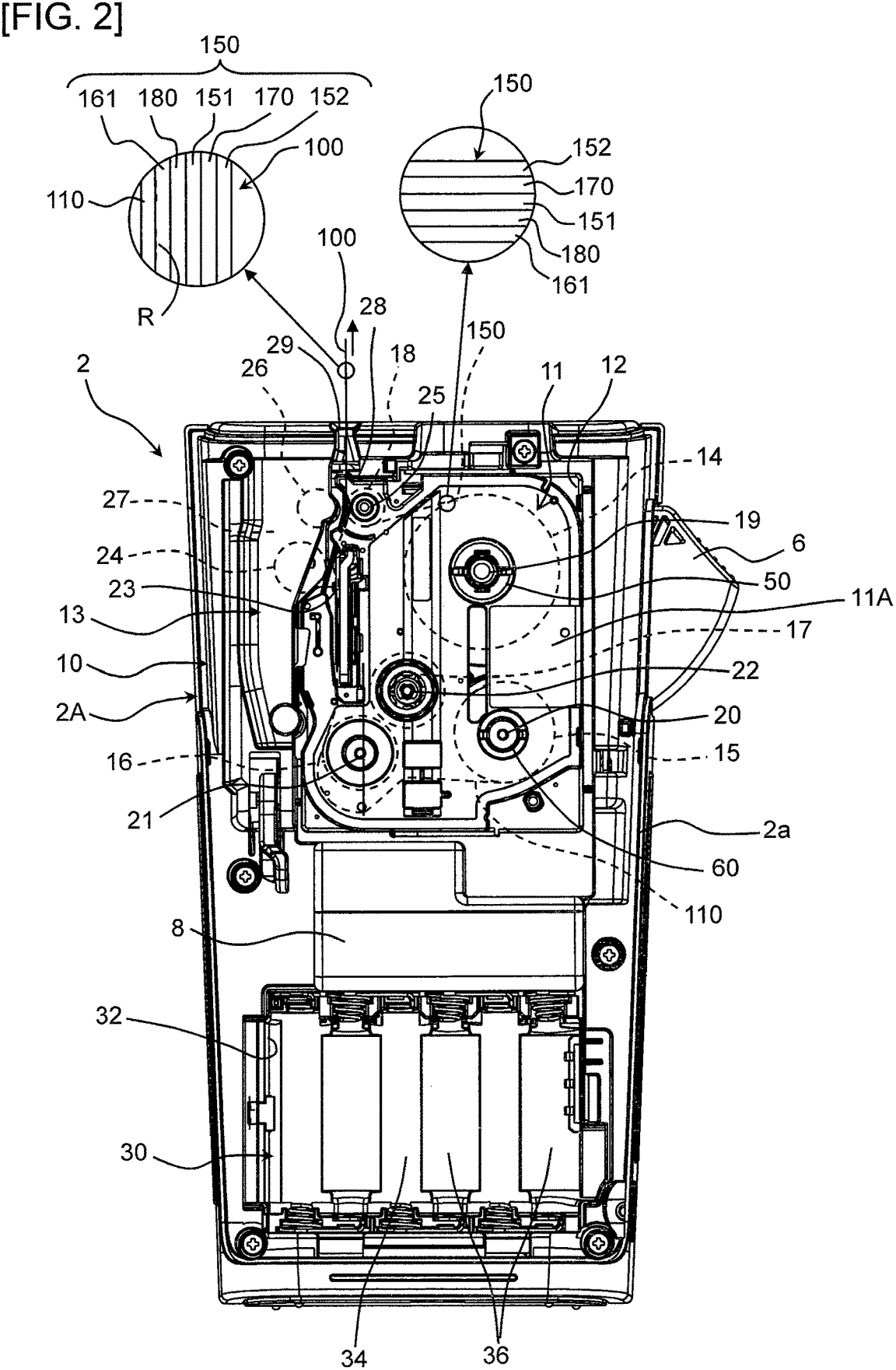
[FIG. 2]

[FIG. 3]
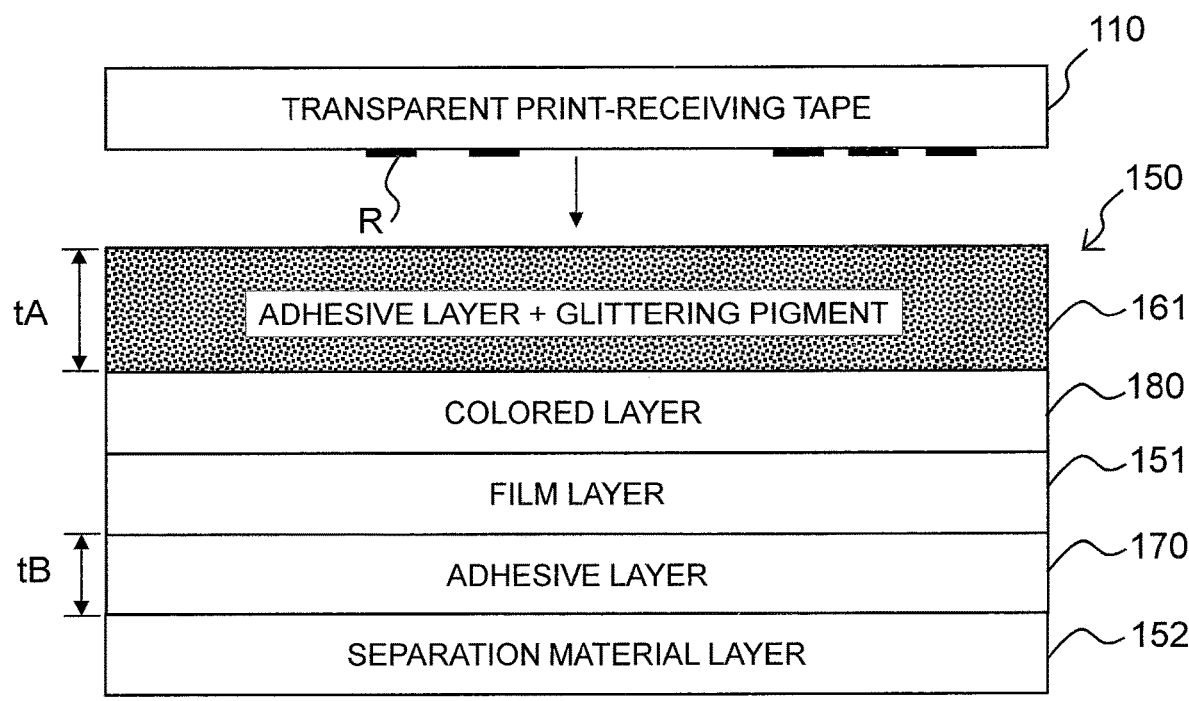

[FIG. 4A]
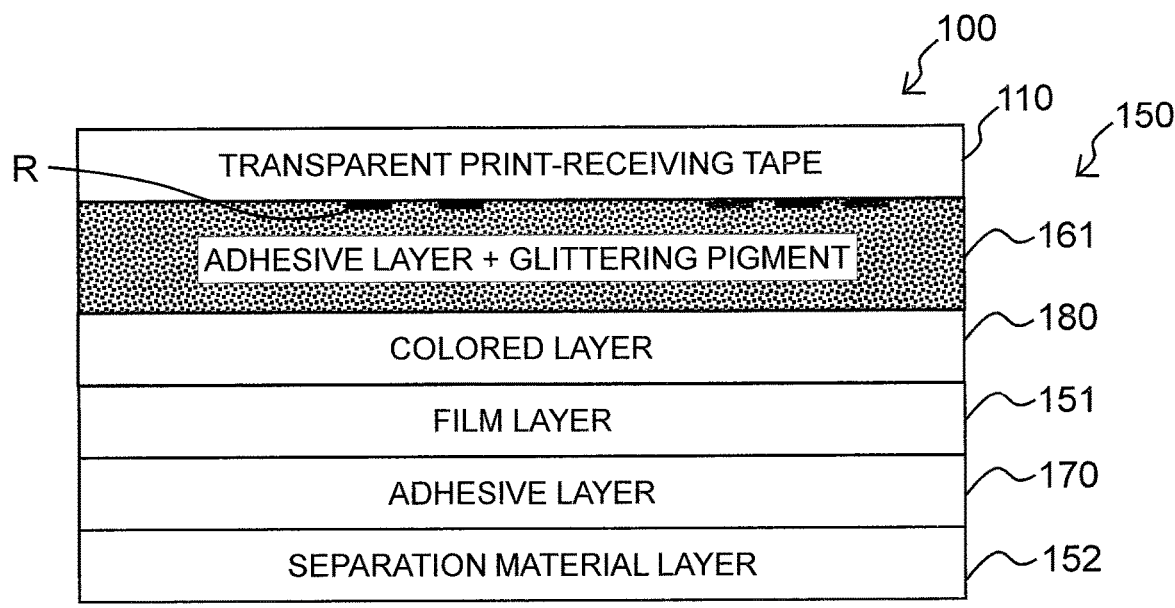
[FIG. 4B]
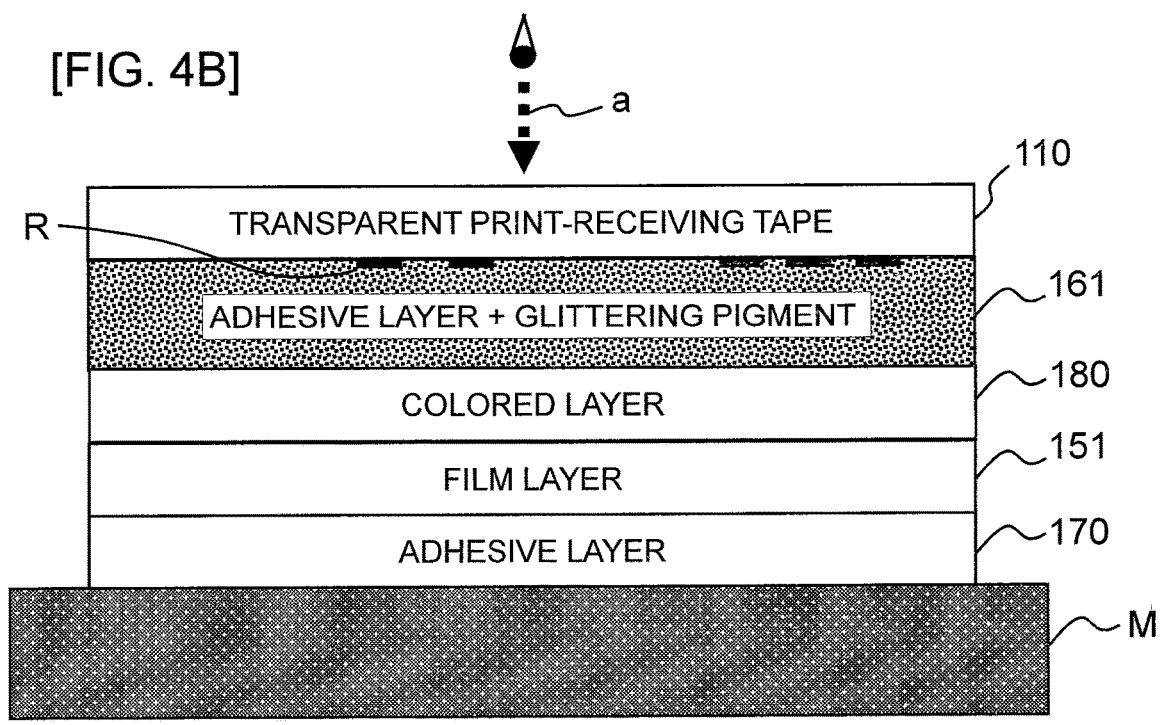

[FIG. 5A]
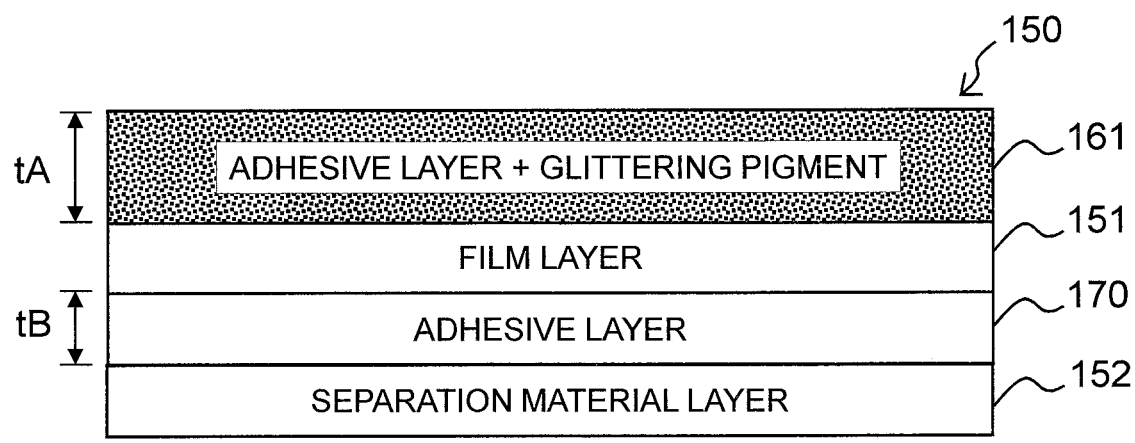
[FIG. 5B]
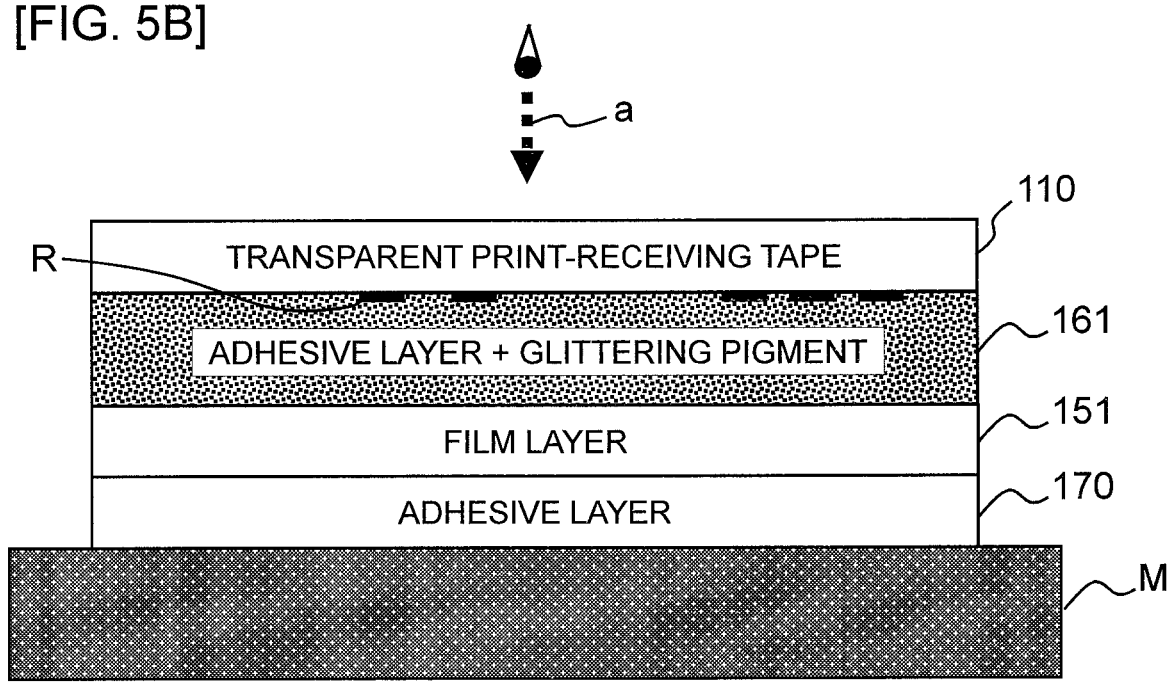

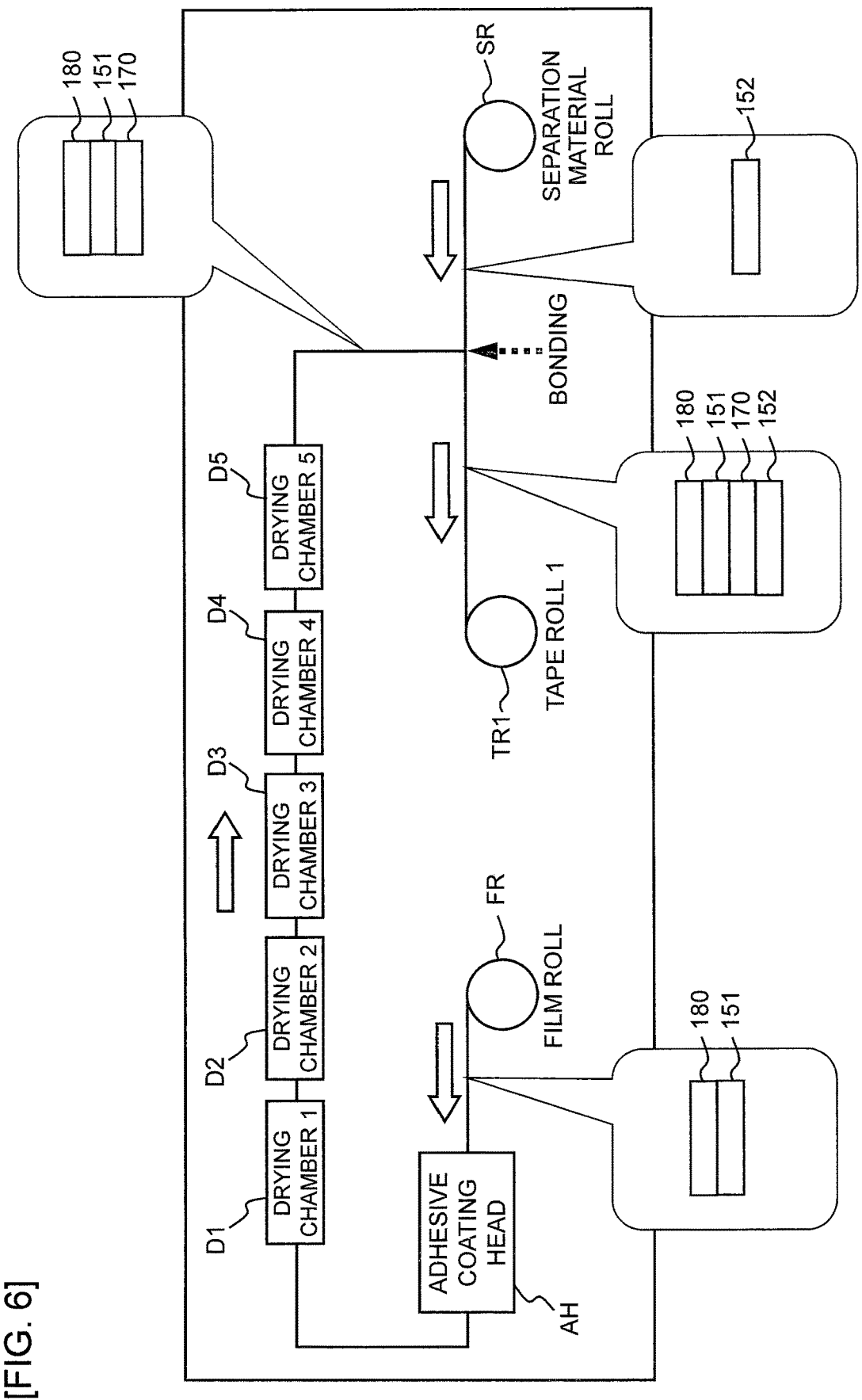
[FIG. 6]

[FIG. 7]
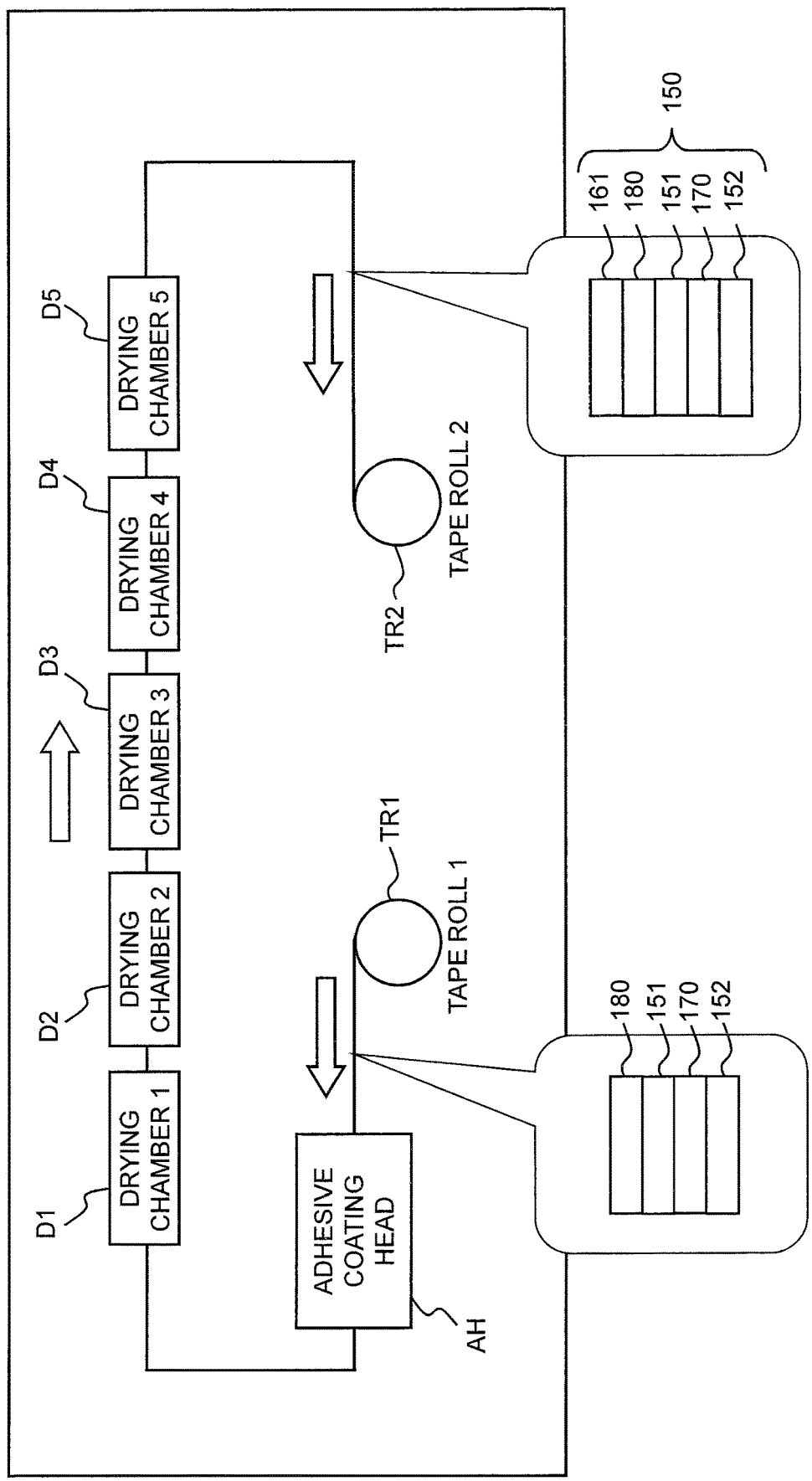

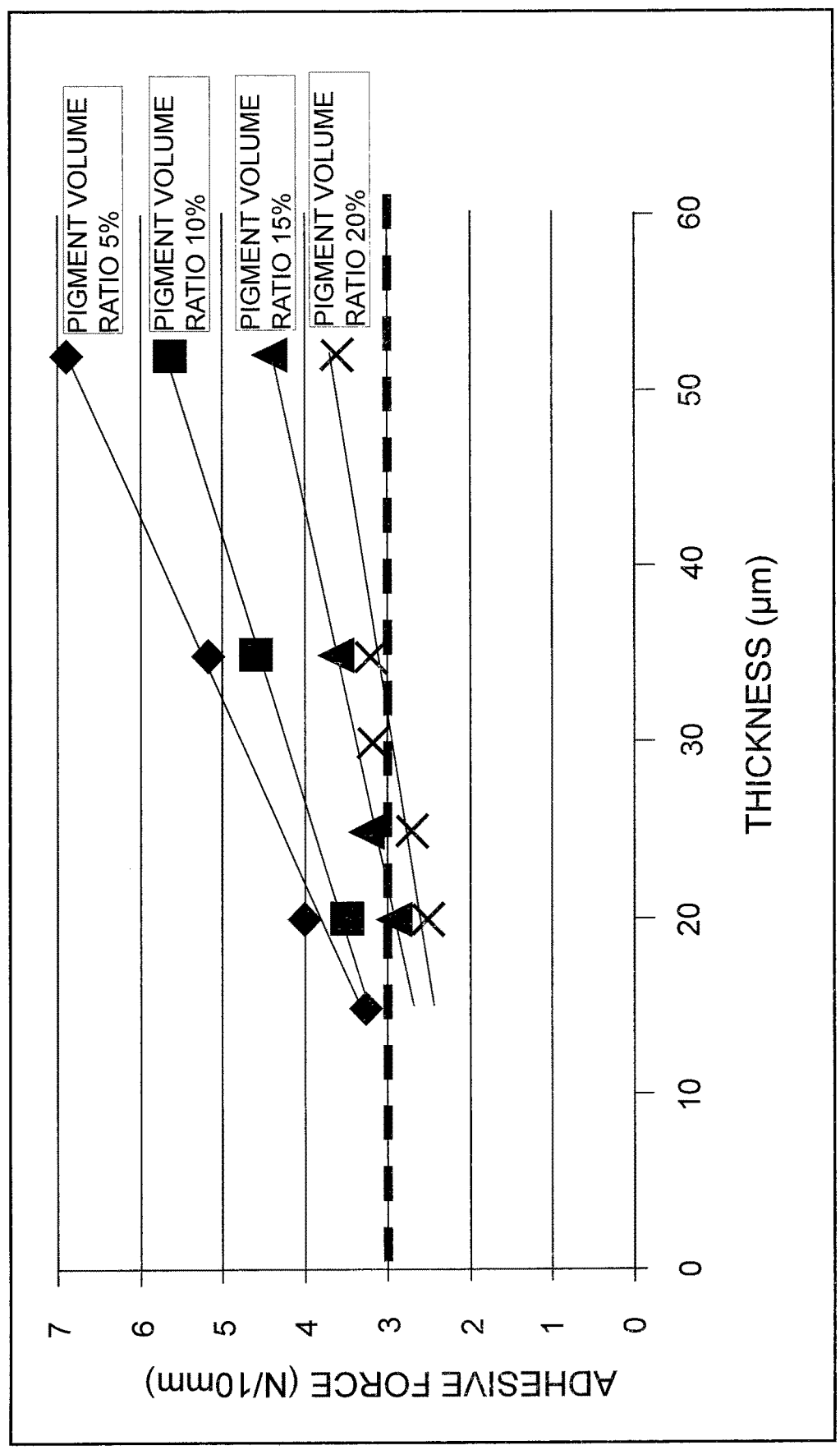
[FIG. 8]

[FIG. 9A]
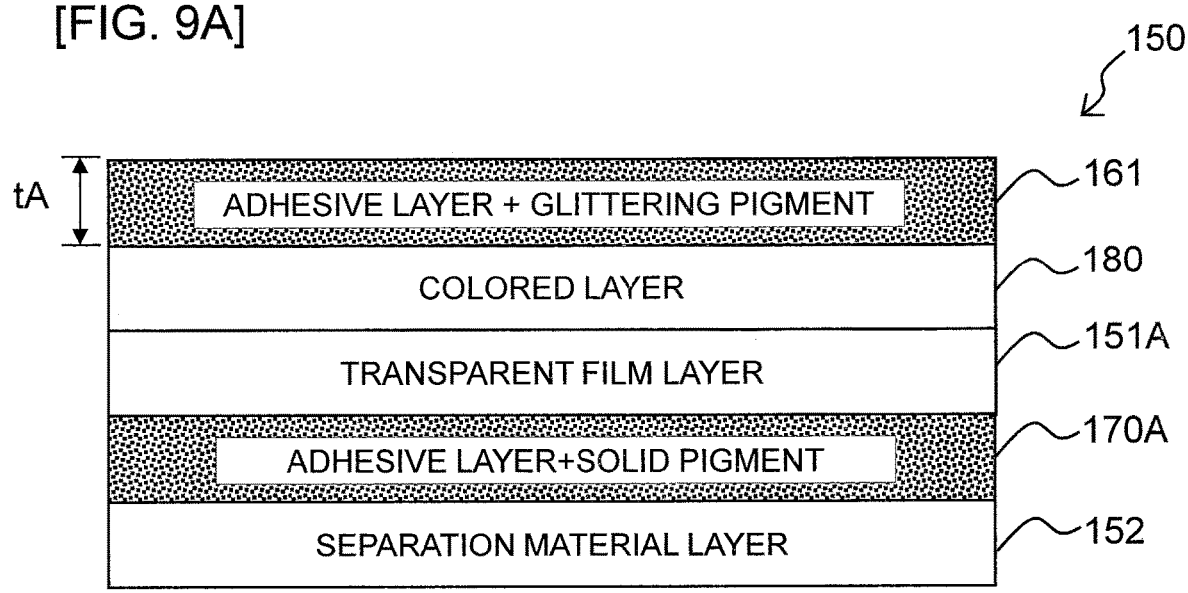
[FIG. 9B]
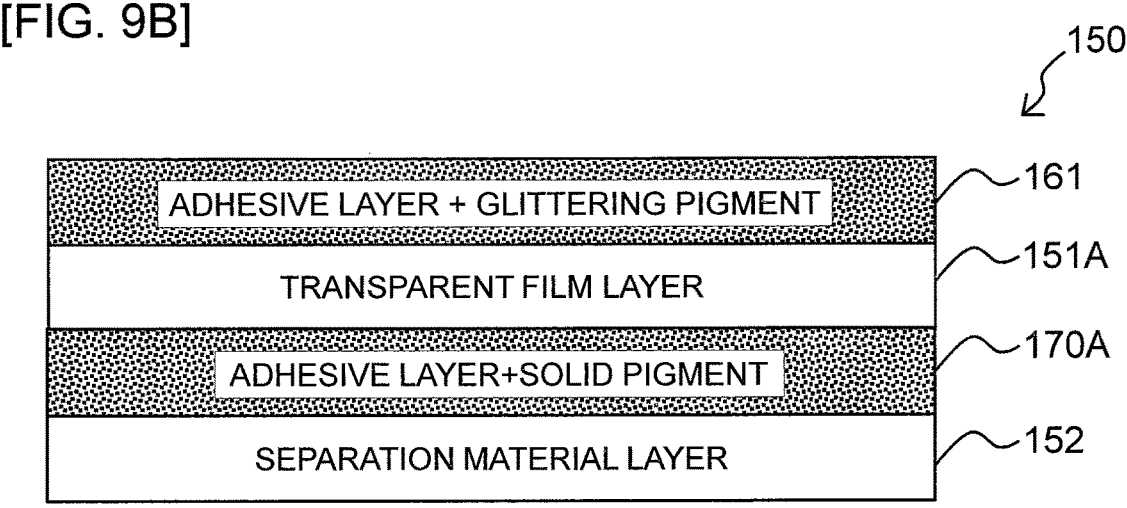

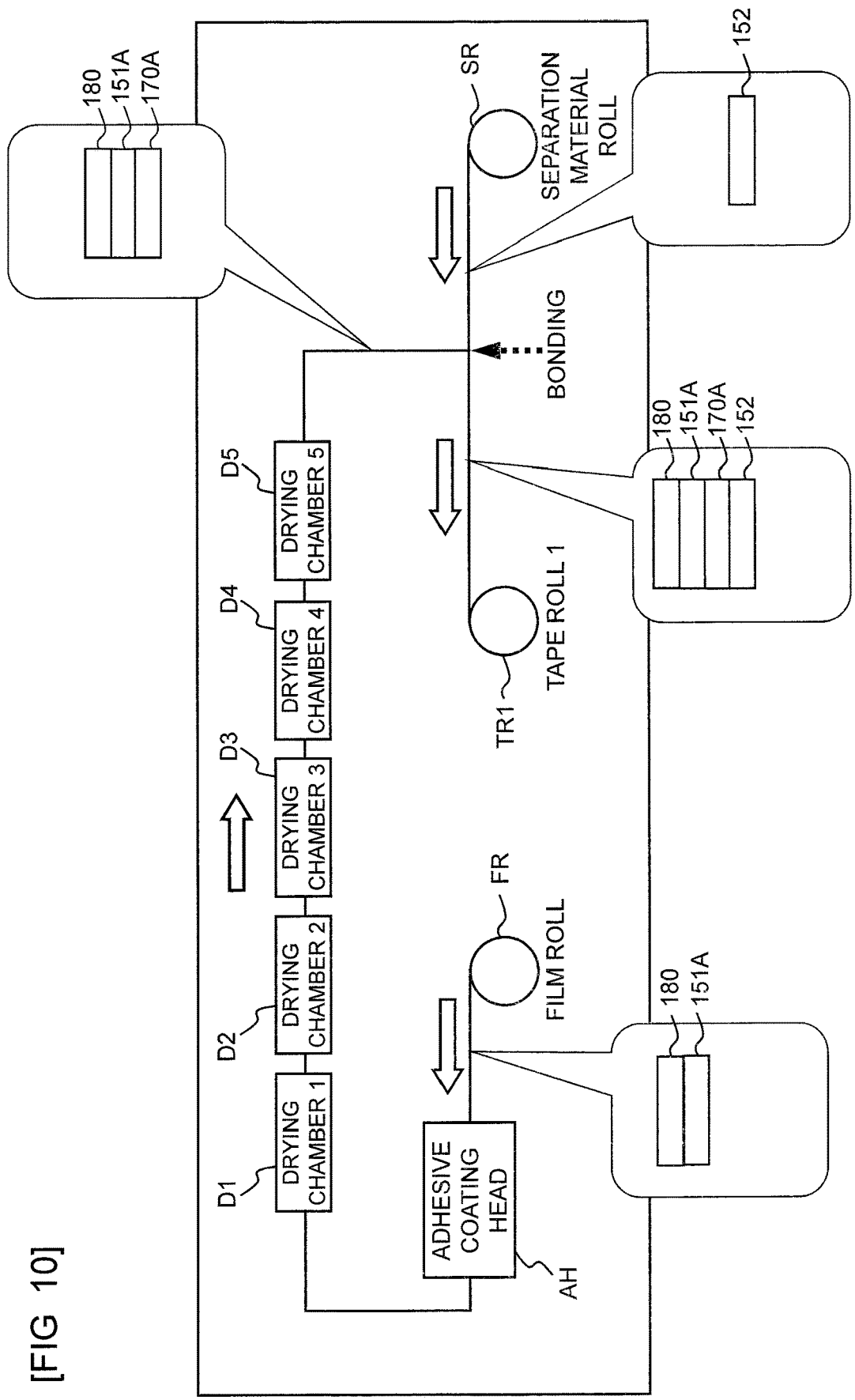
[FIG 10]

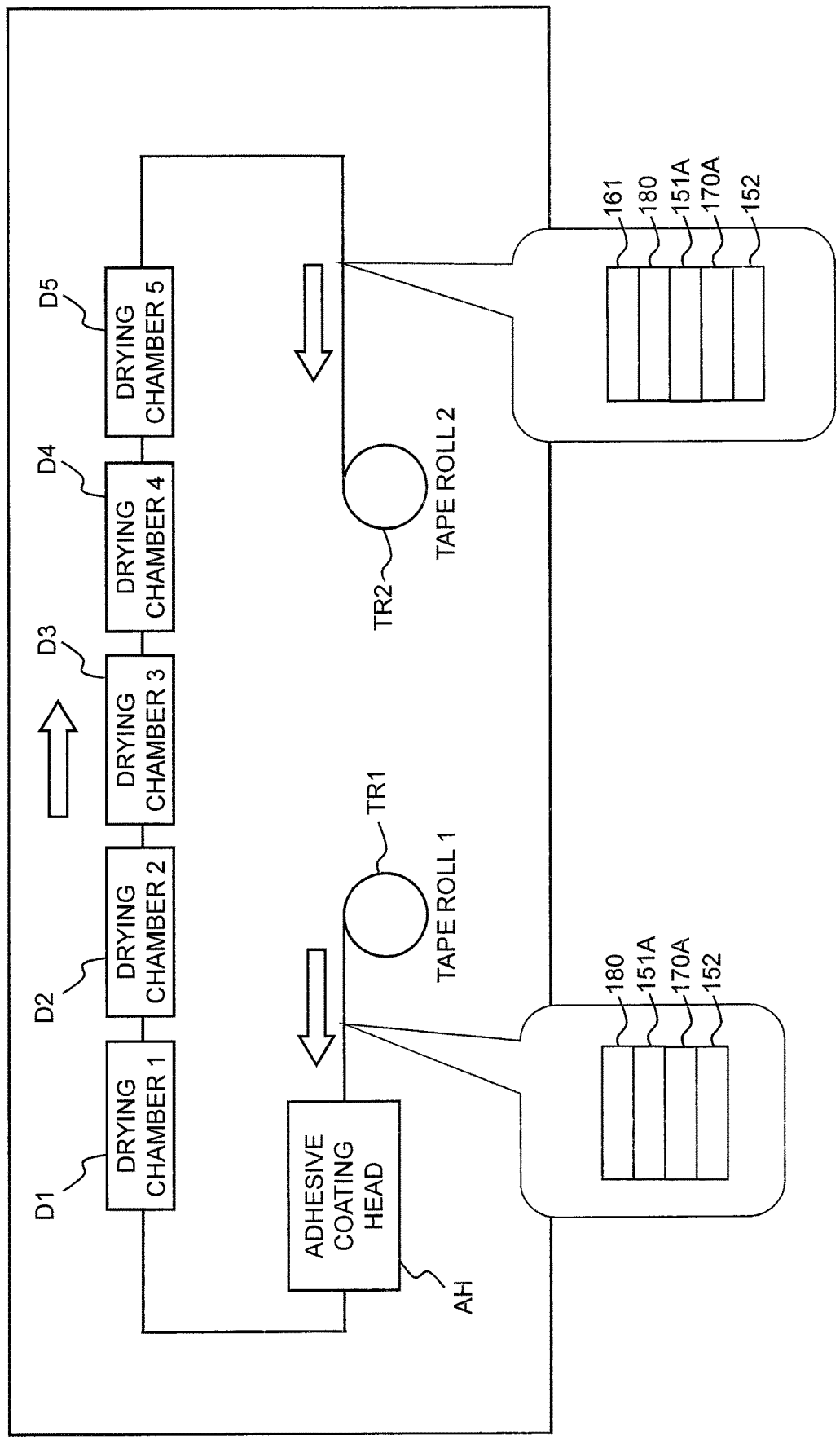
[FIG. 11]

[FIG. 12]
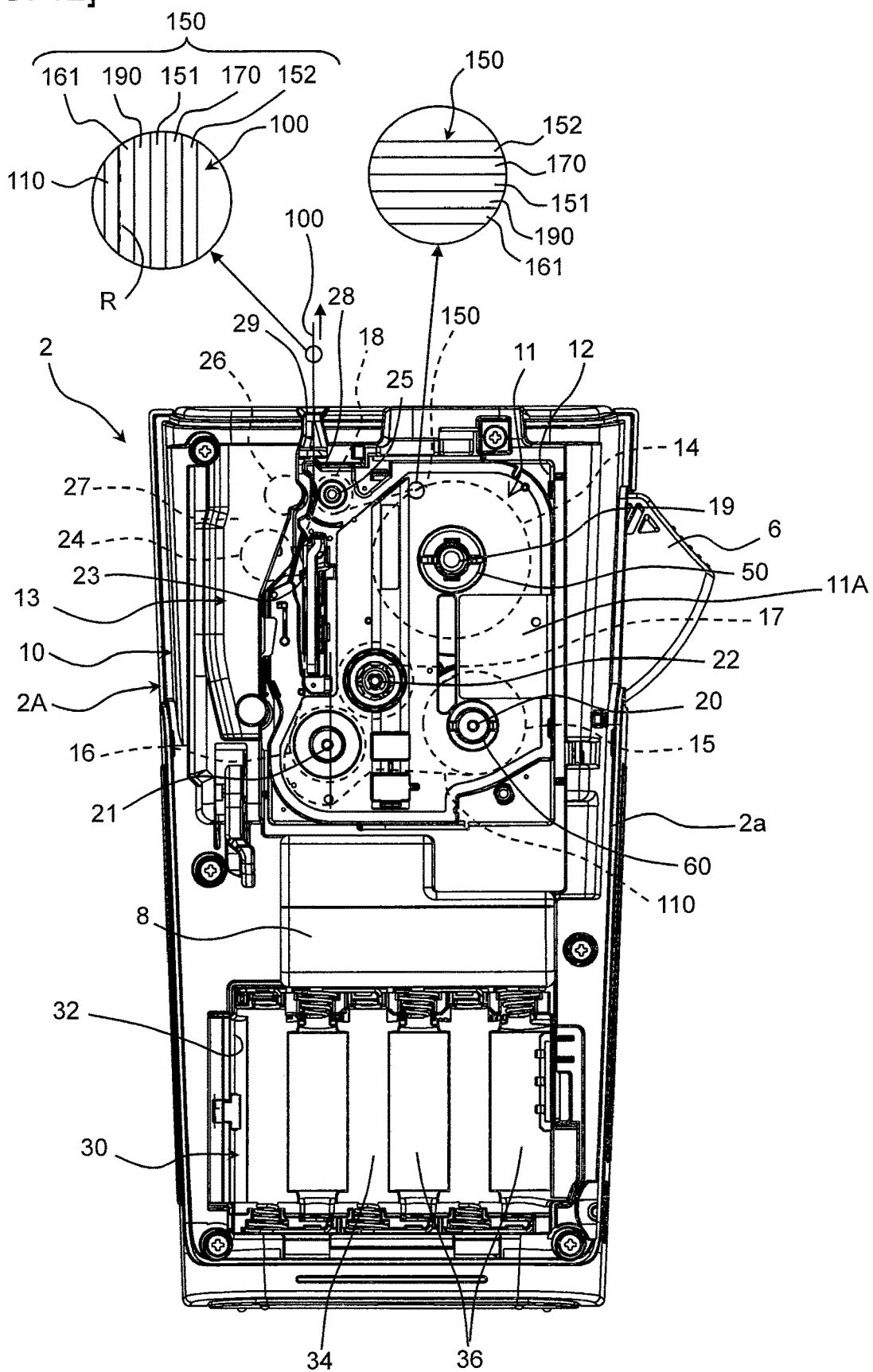

[FIG. 13]
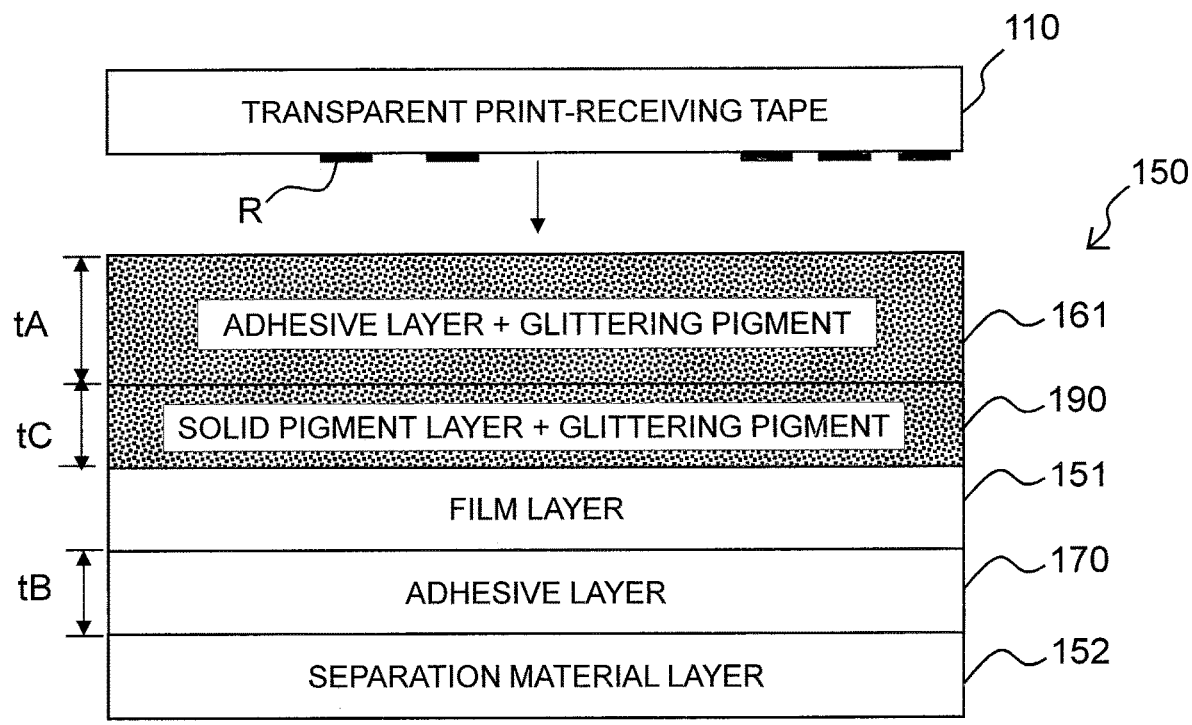

[FIG. 14]
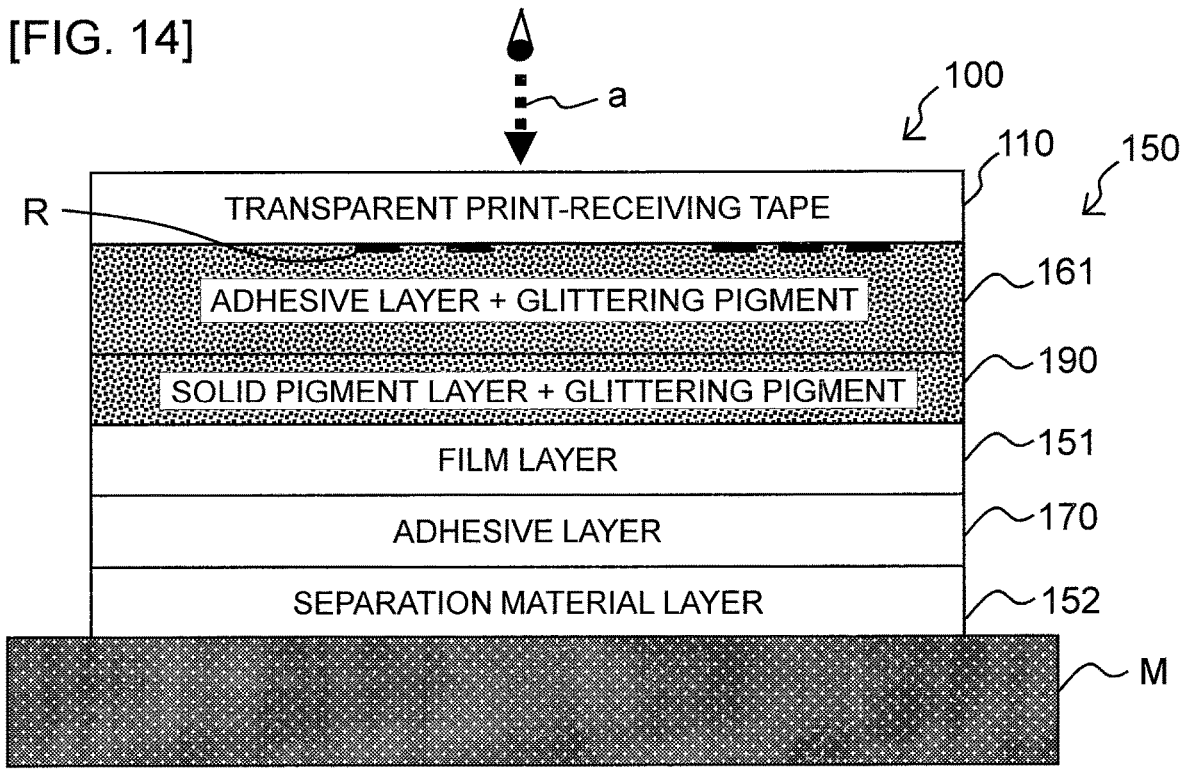
[FIG. 15]
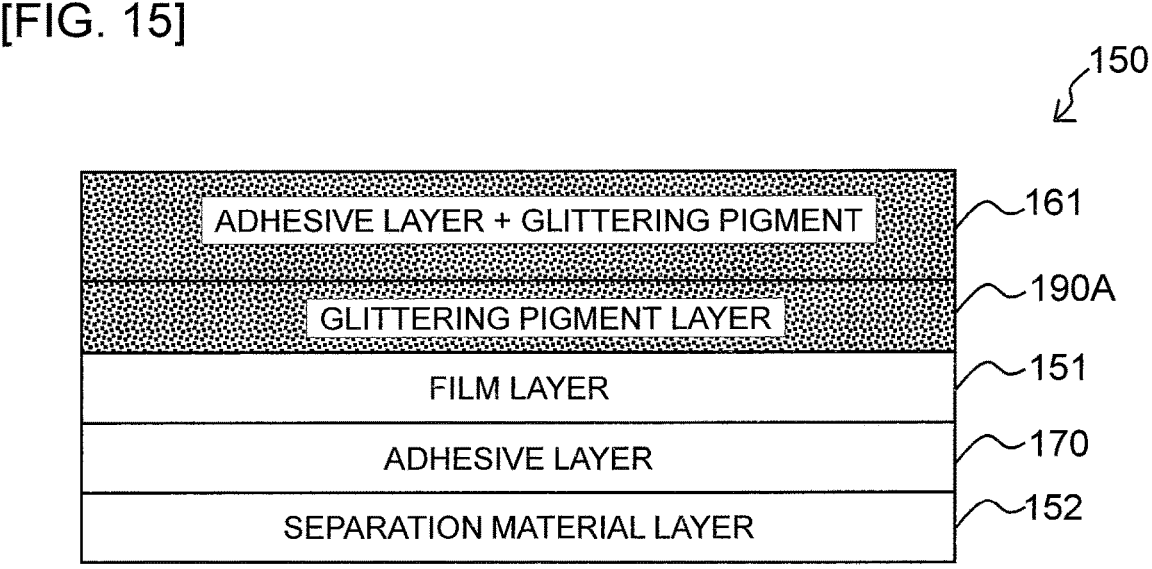

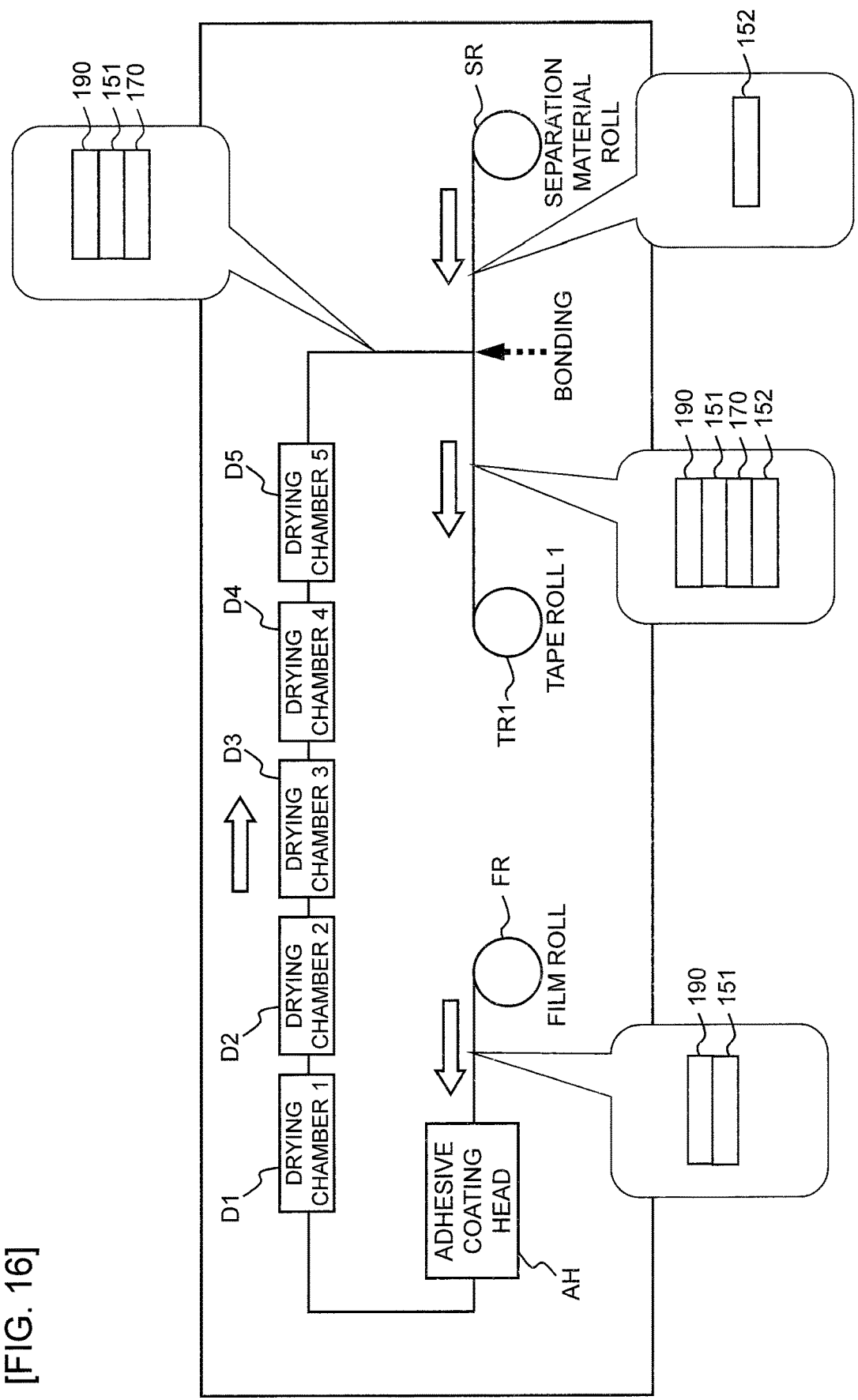
[FIG. 16]

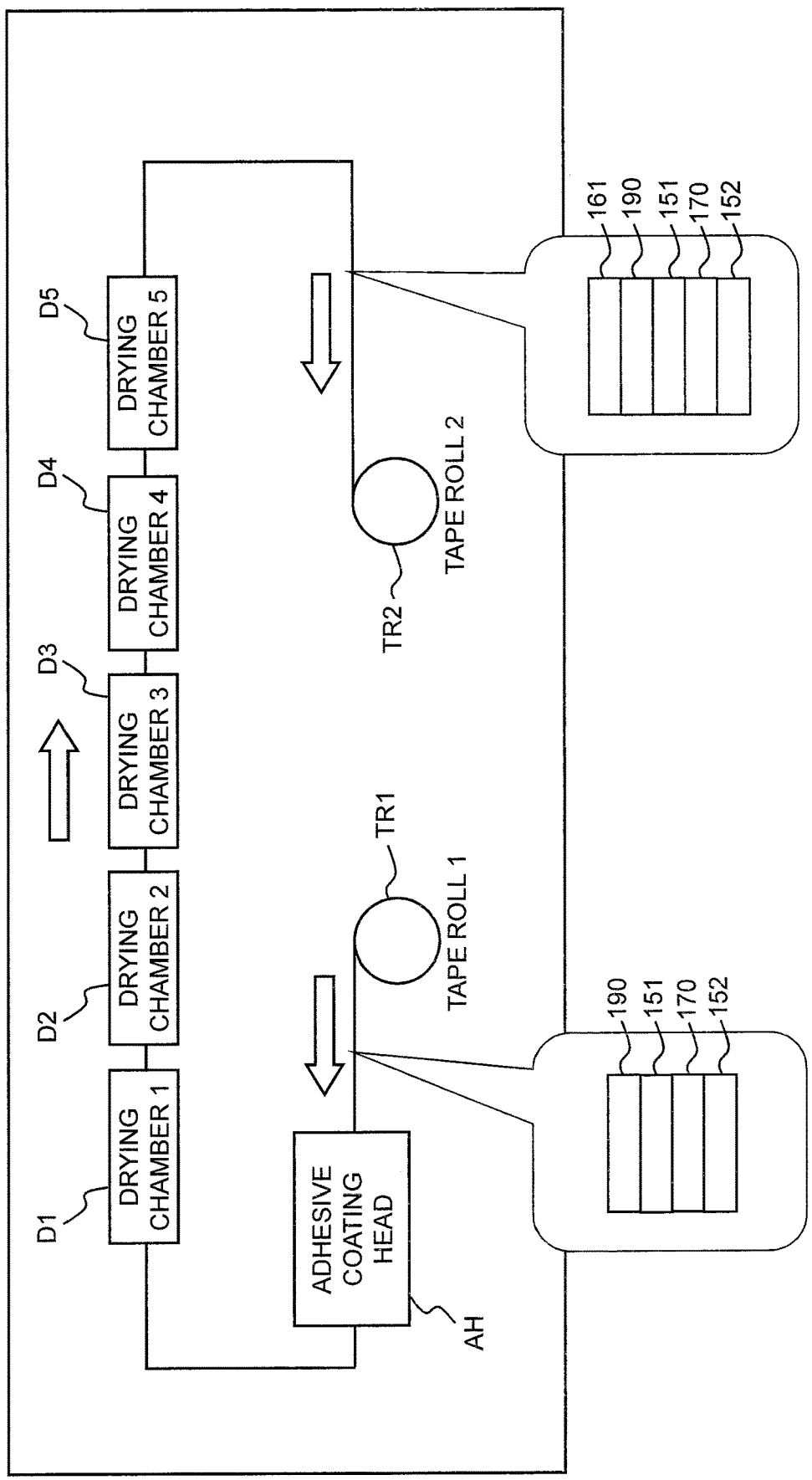
[FIG. 17]

[FIG. 18]
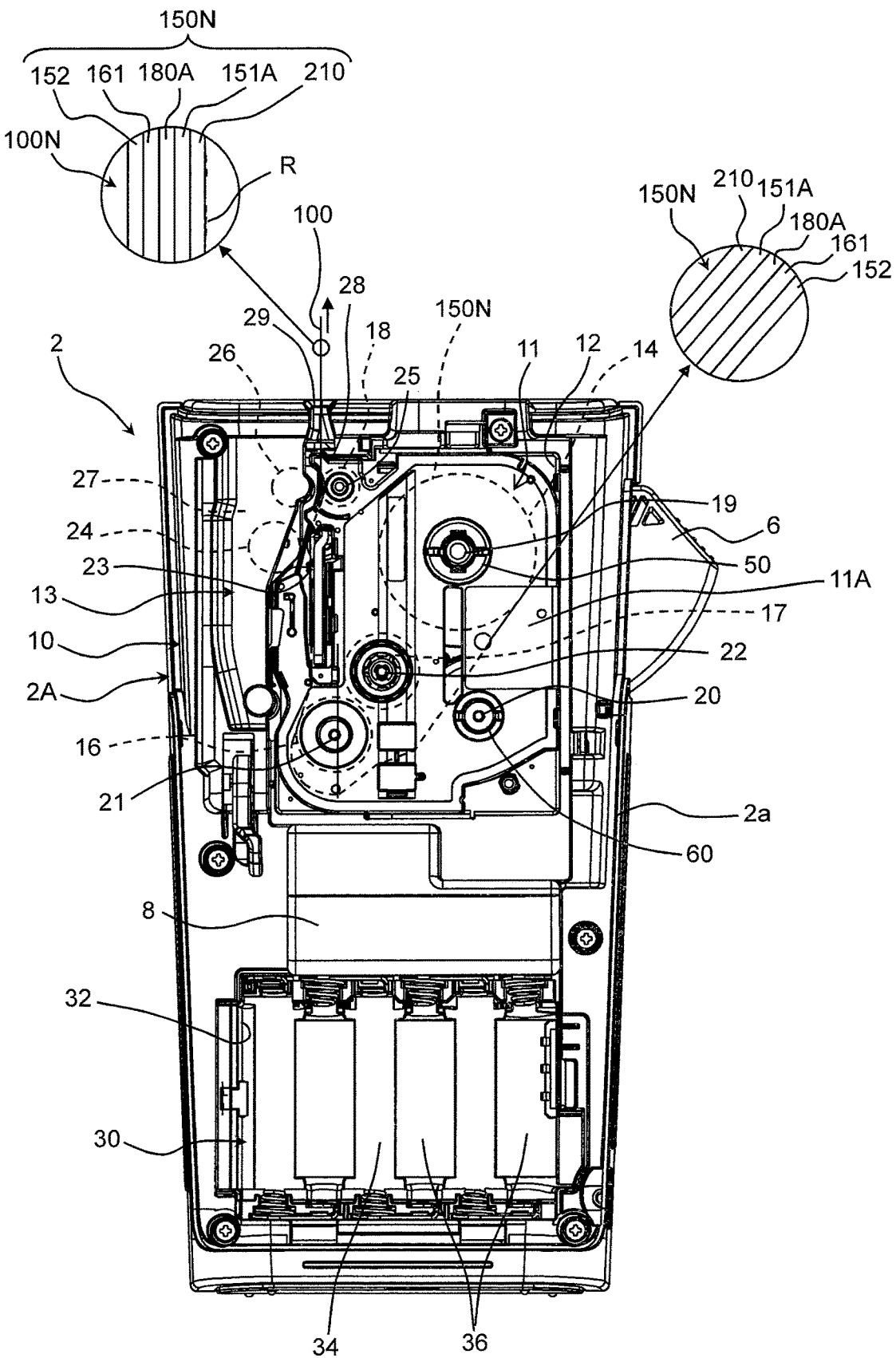

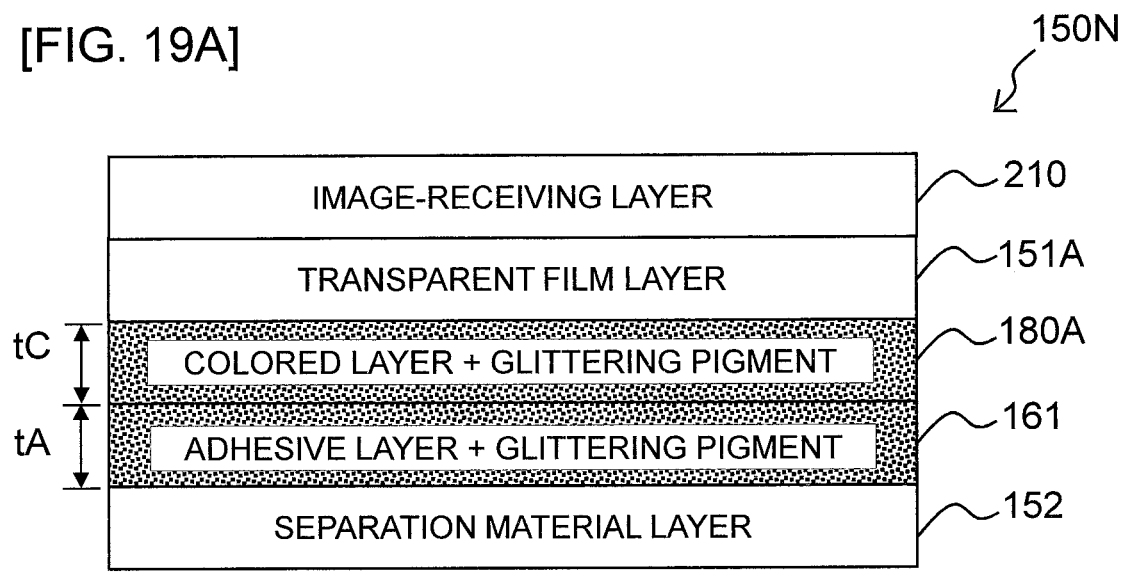
[FIG. 19A]
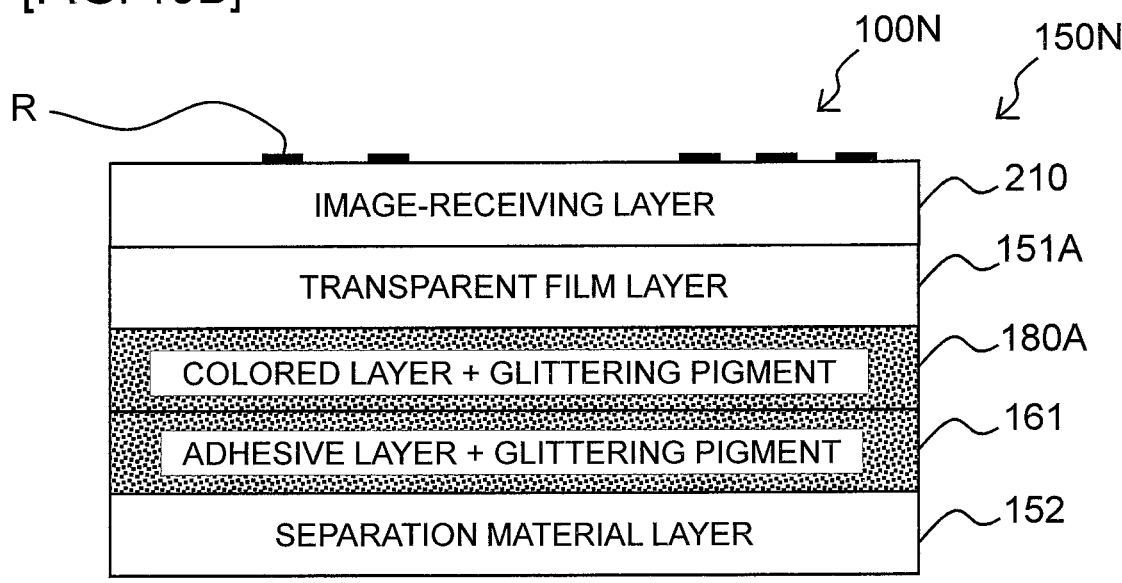
[FIG. 19B]

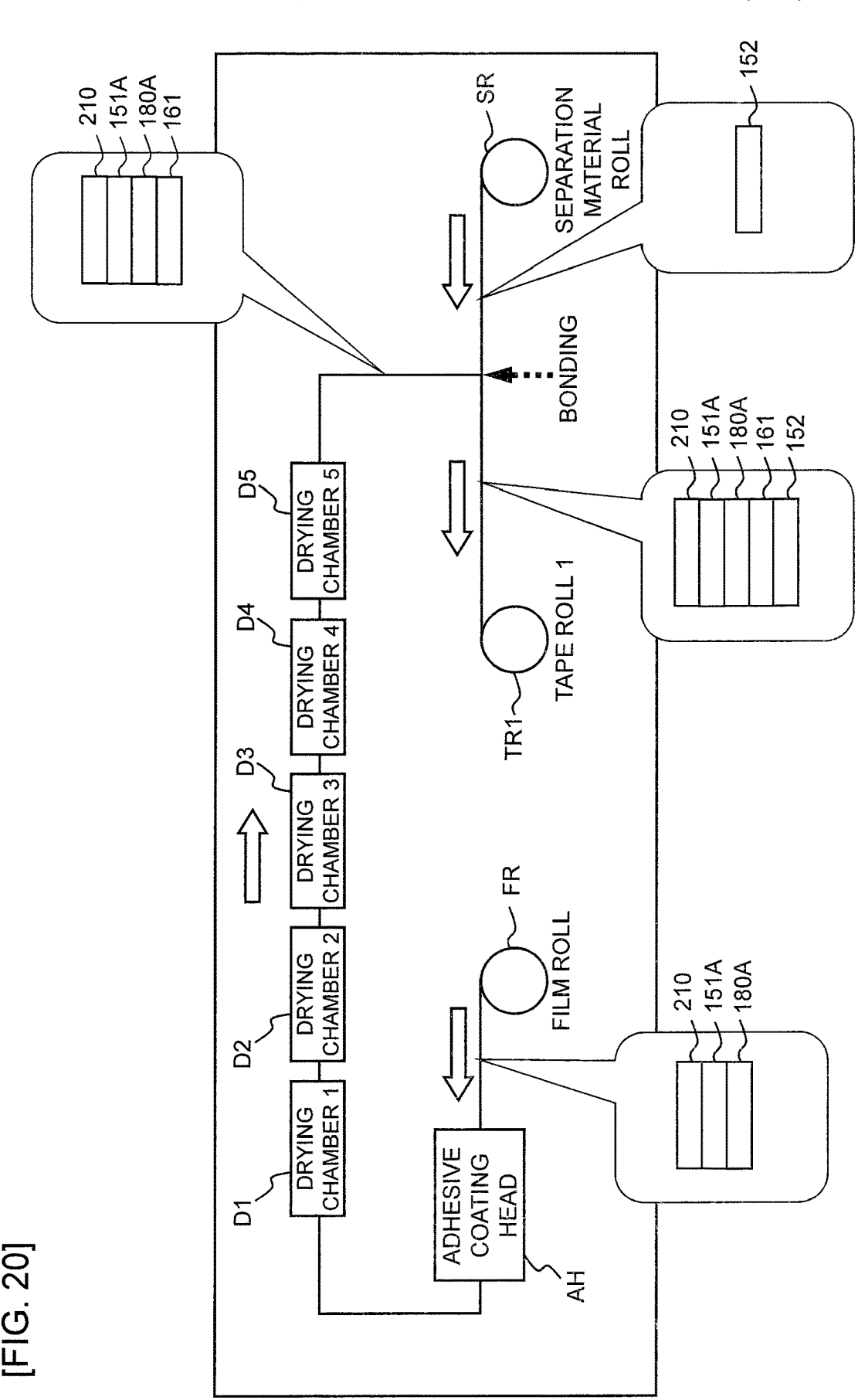
[FIG. 20]

[FIG. 21]
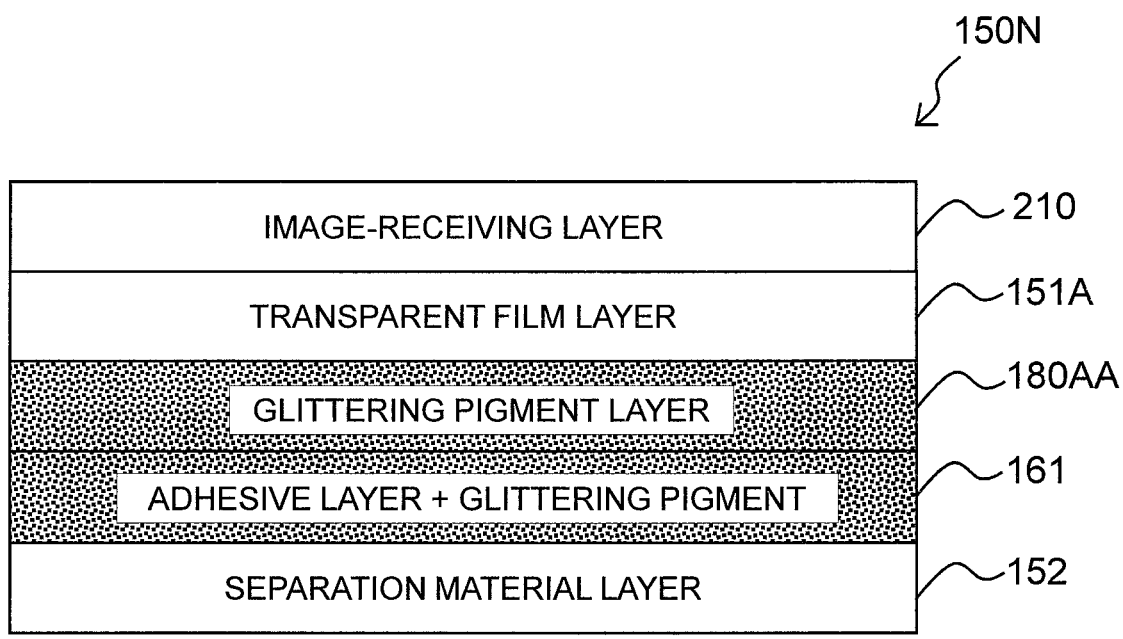

[FIG. 22A]
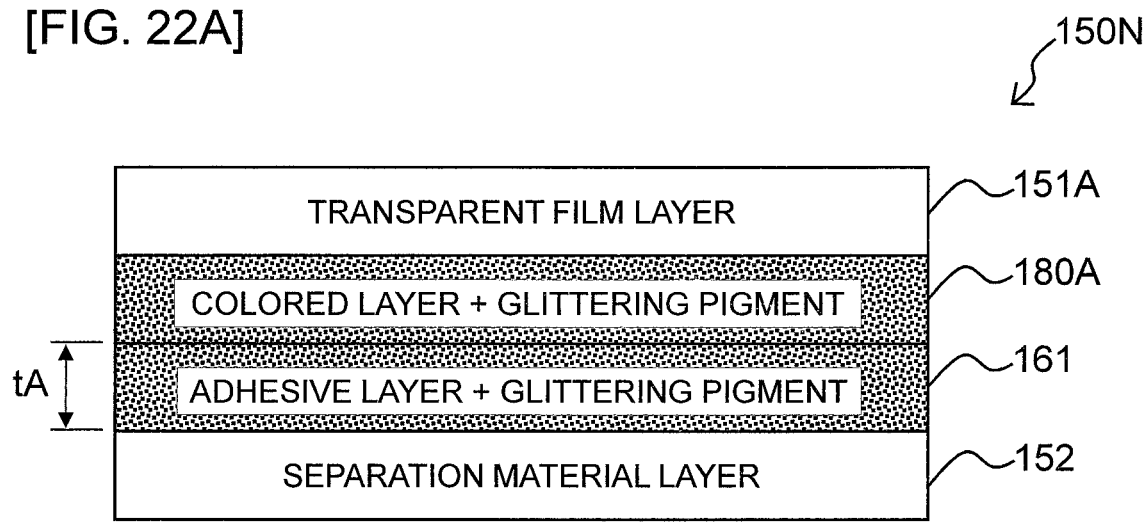
[FIG. 22B]
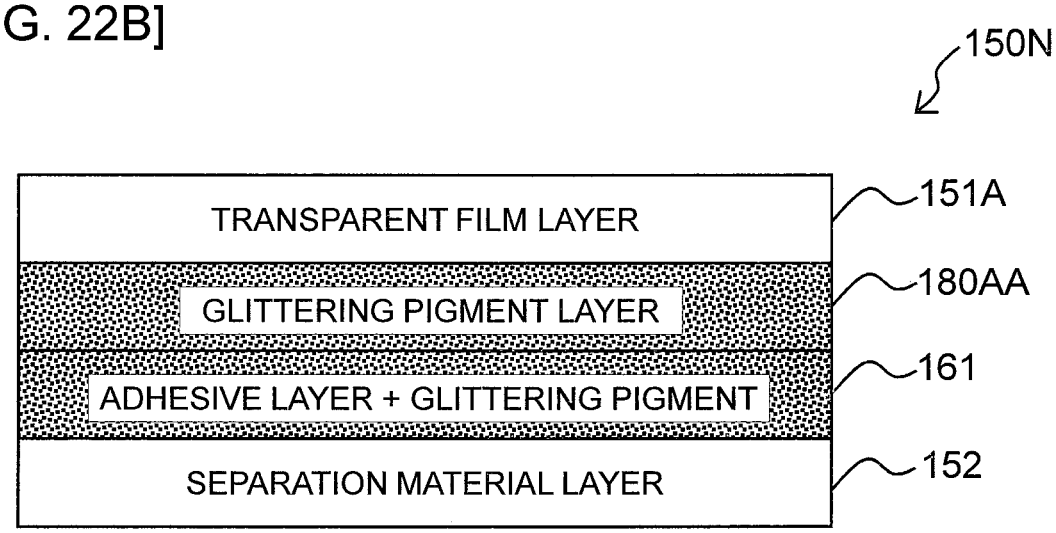

[FIG. 23A]
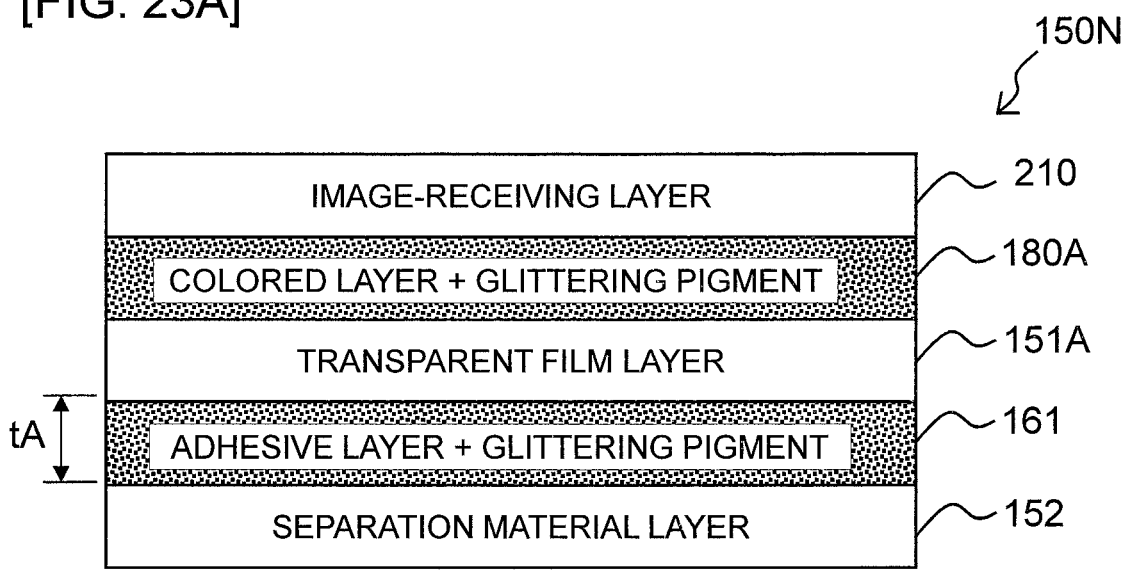
[FIG. 23B]
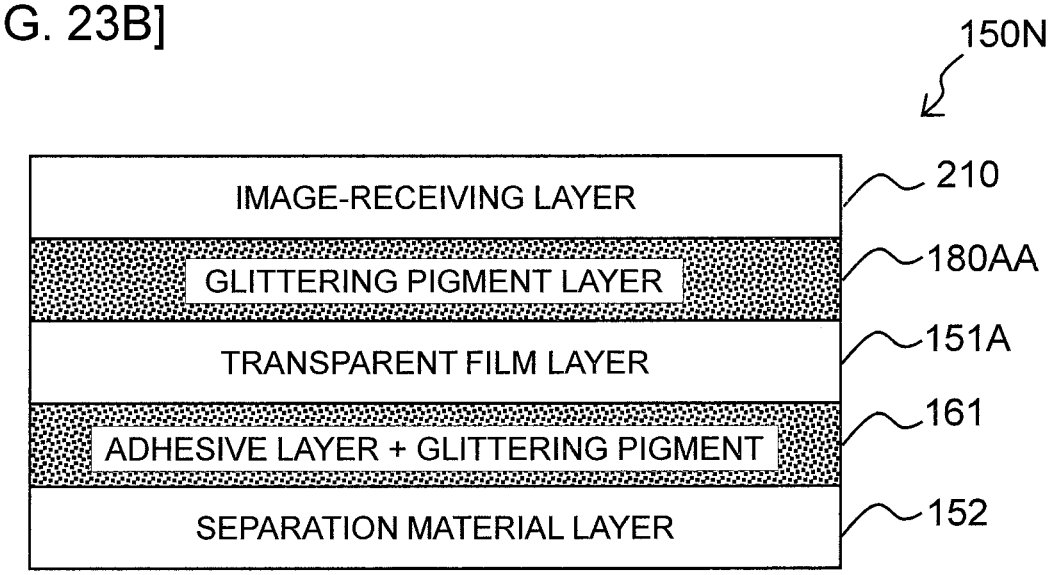

[FIG. 24A]
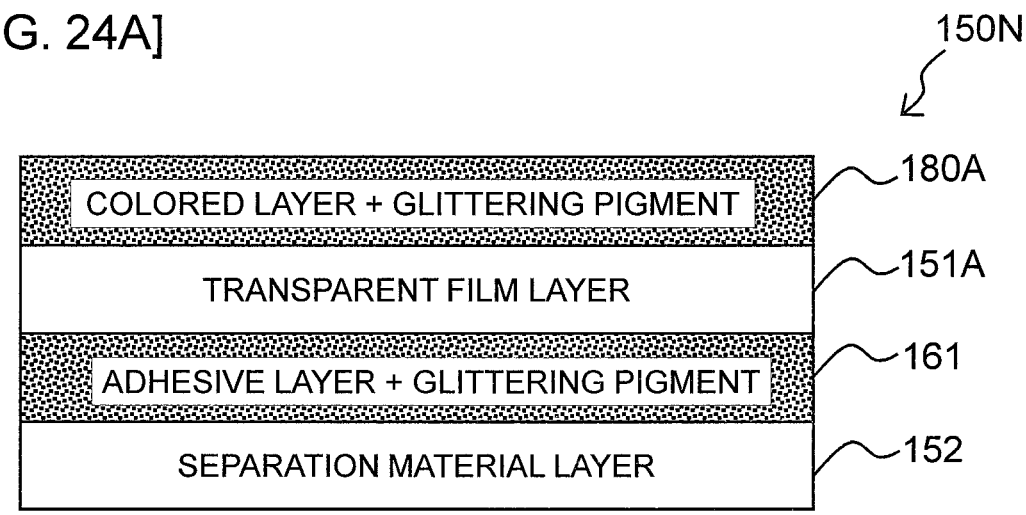
[FIG. 24B]
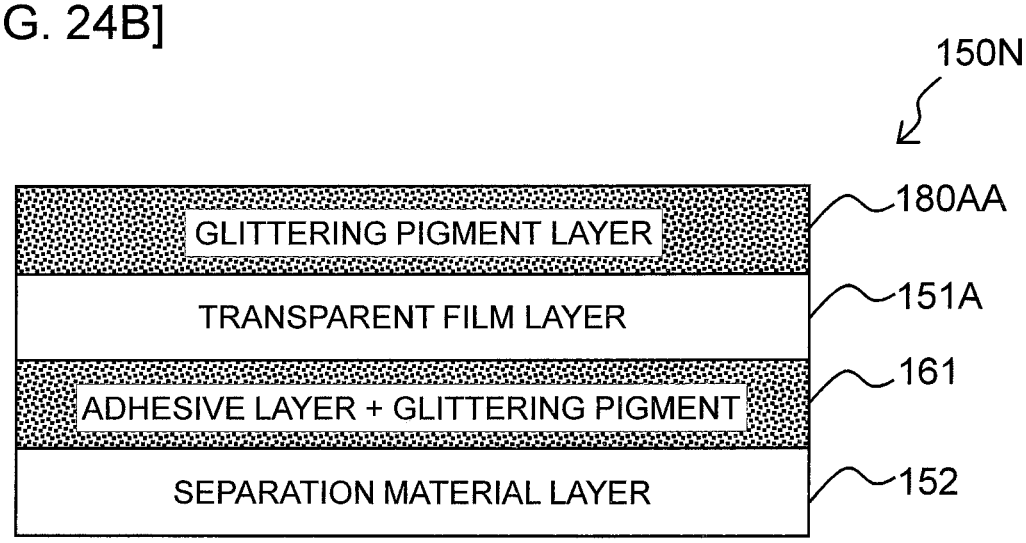

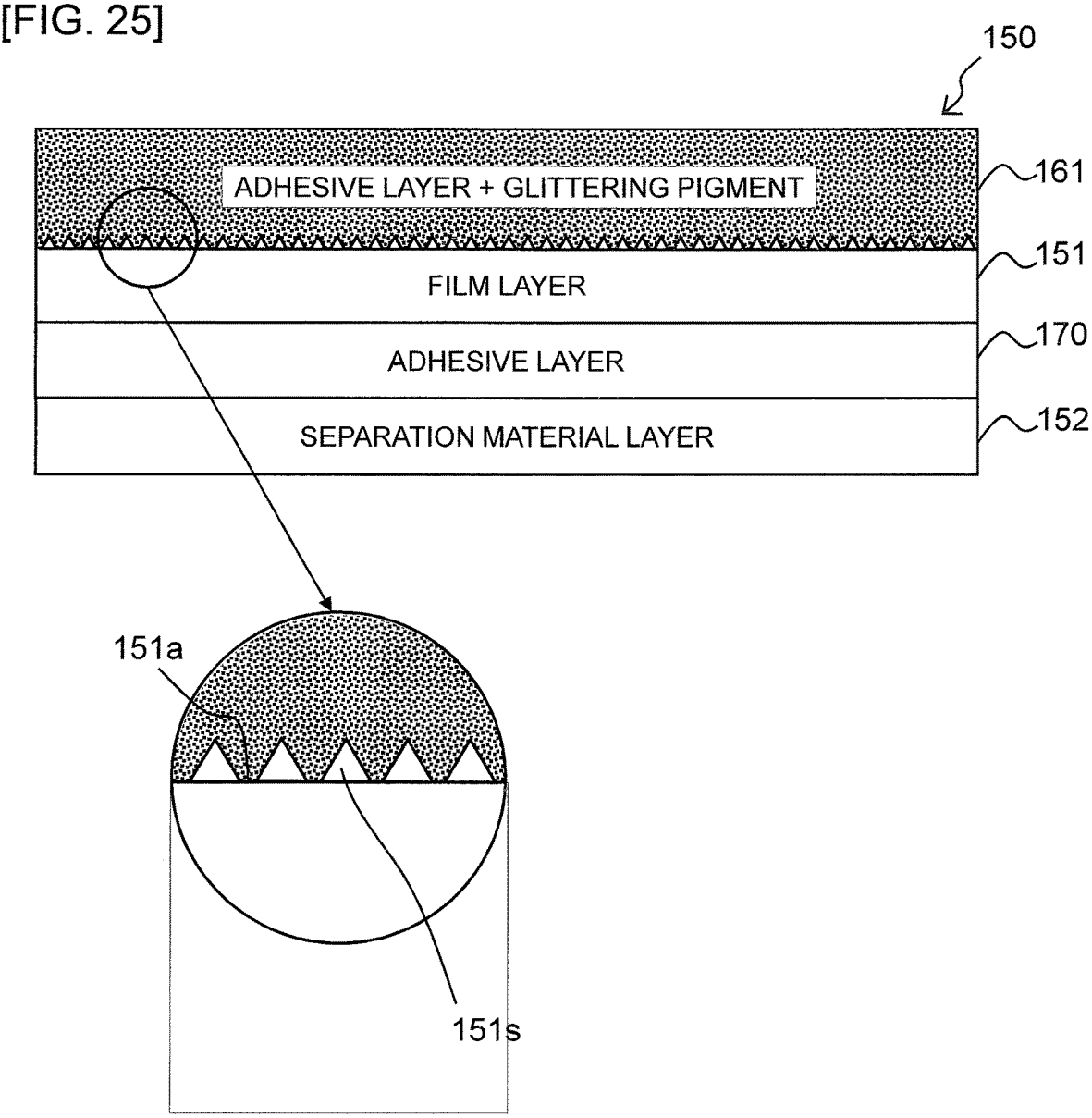
[FIG. 25]

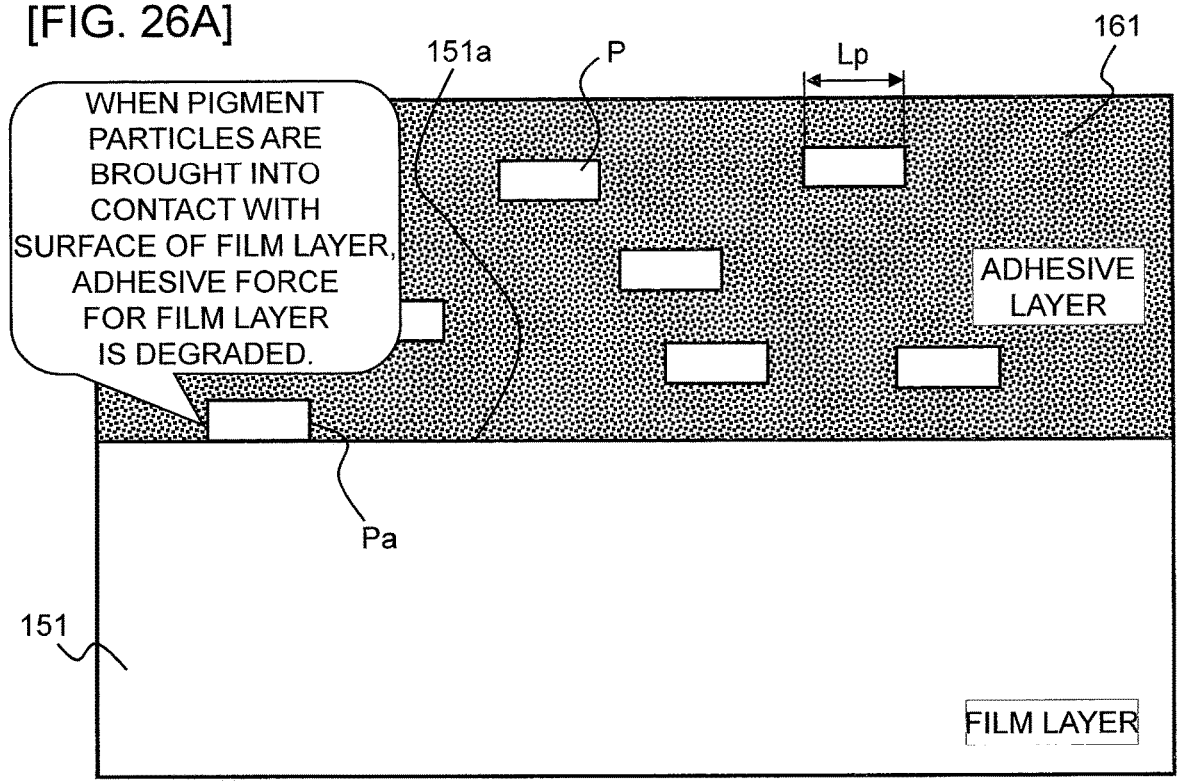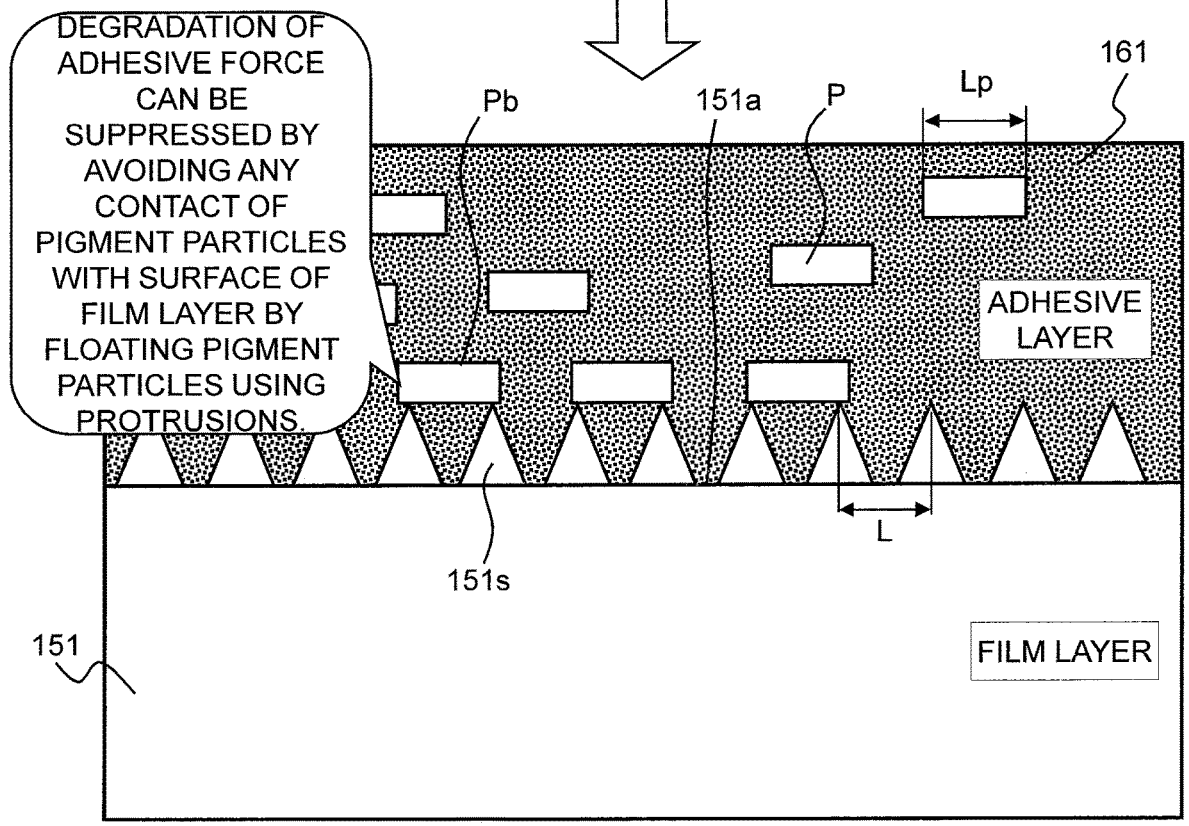

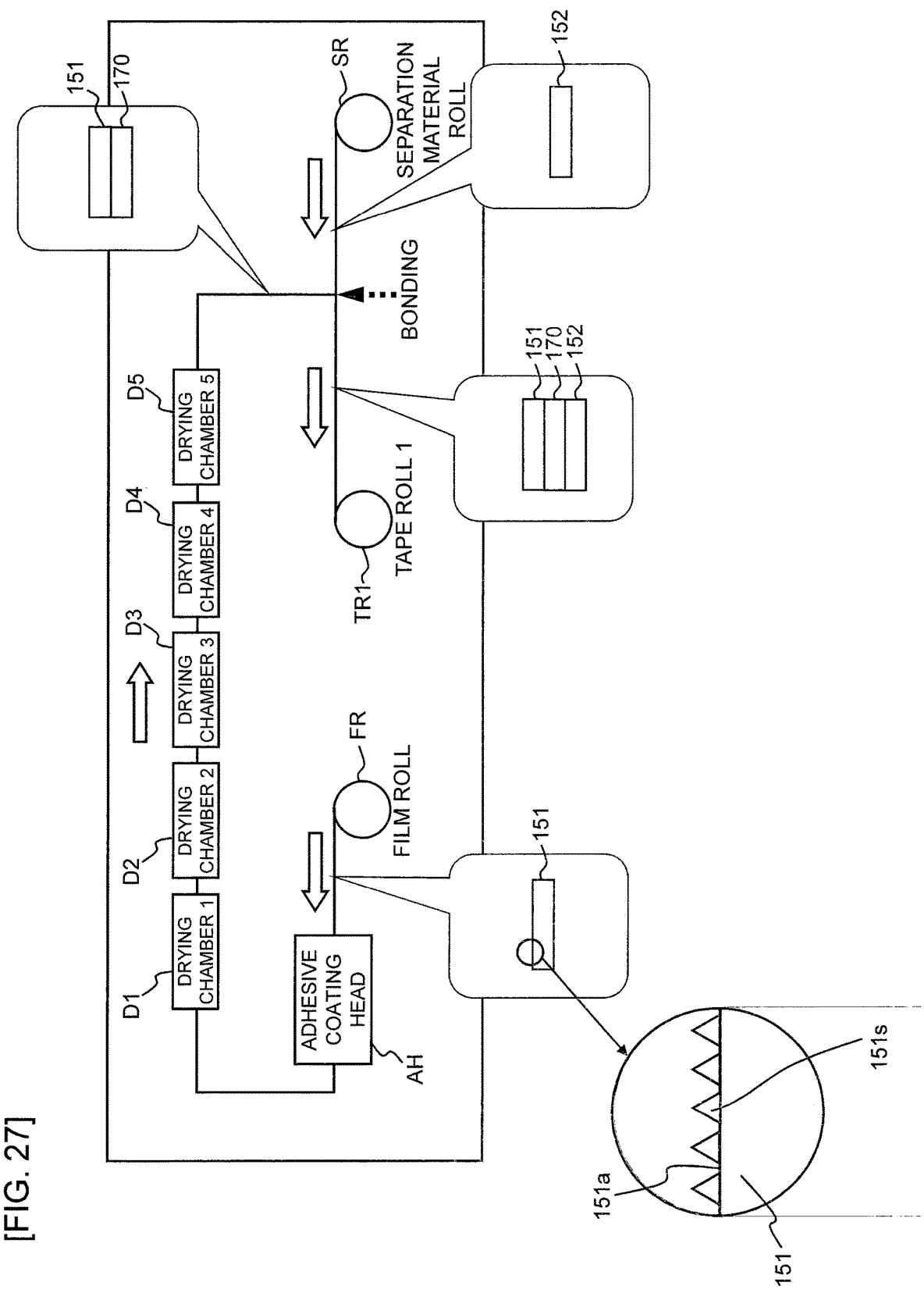
[FIG. 27]

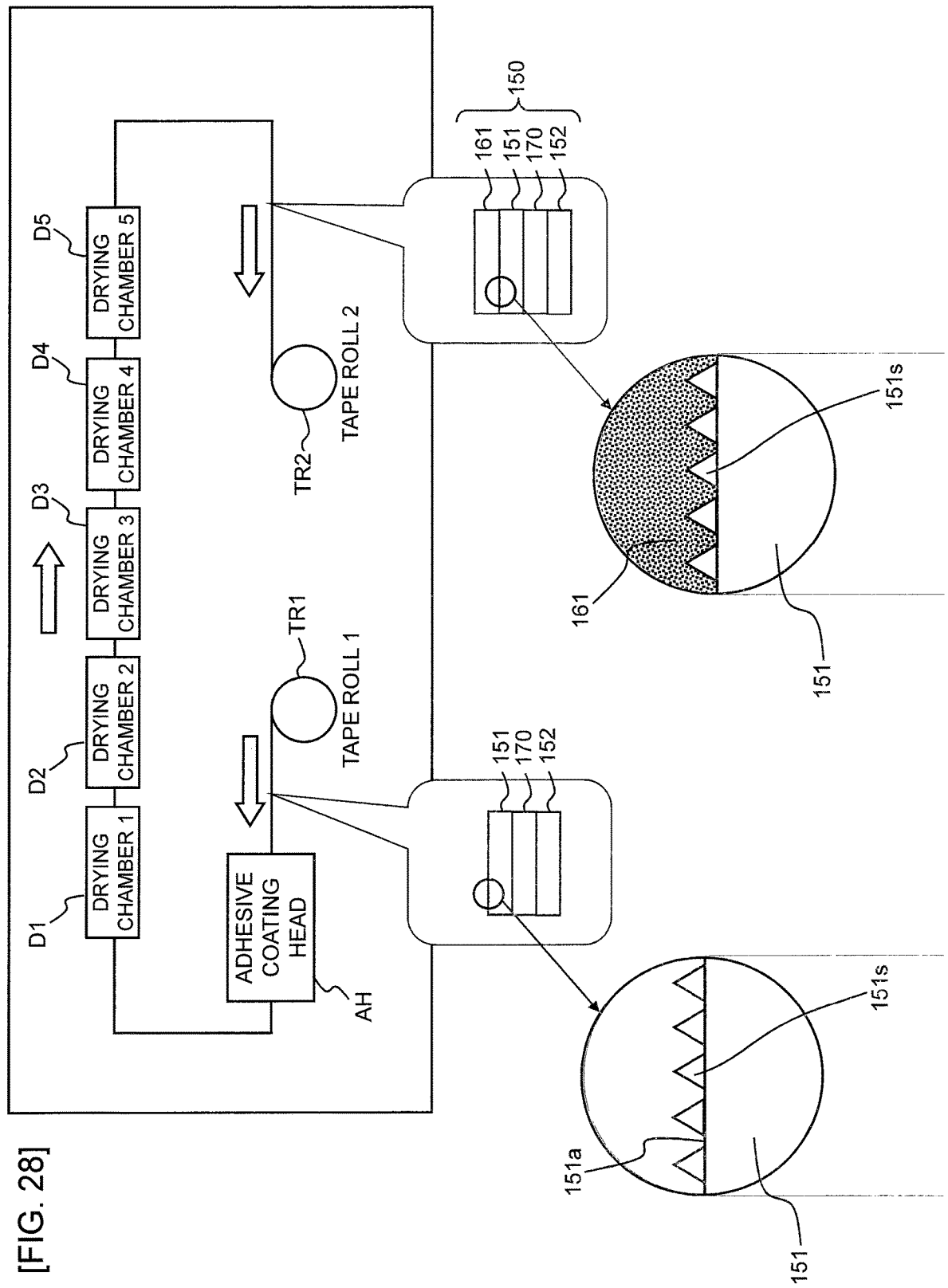

[FIG. 29A]
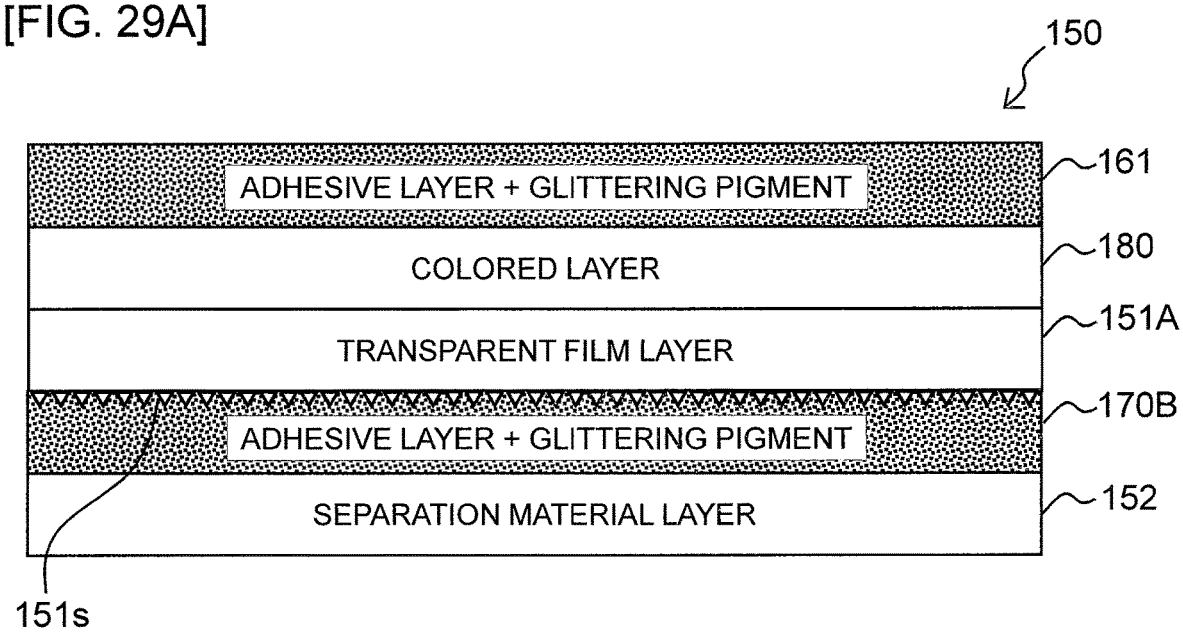
[FIG. 29B]
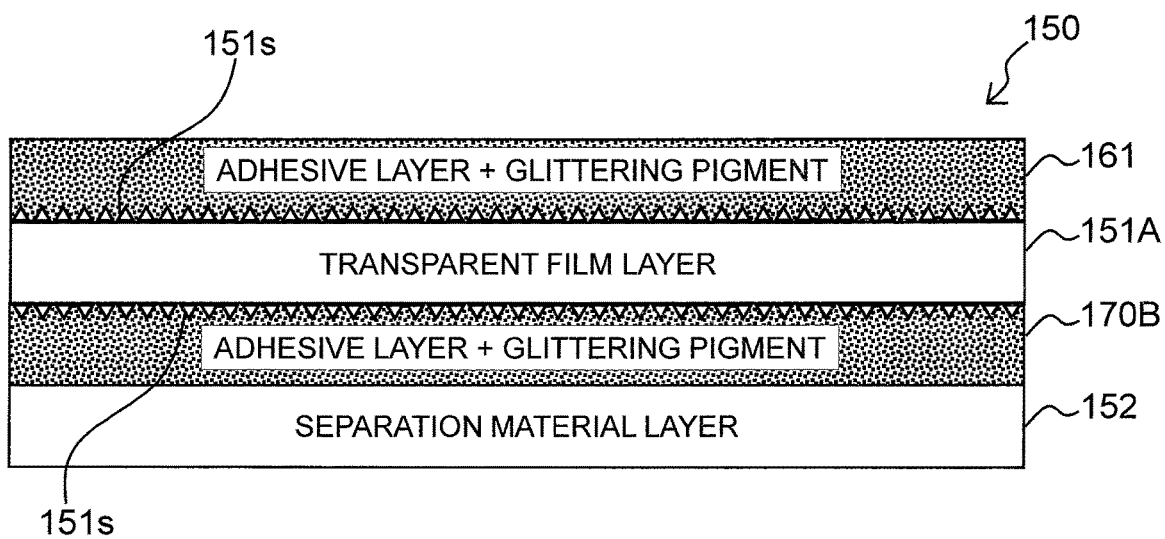

[FIG. 30]
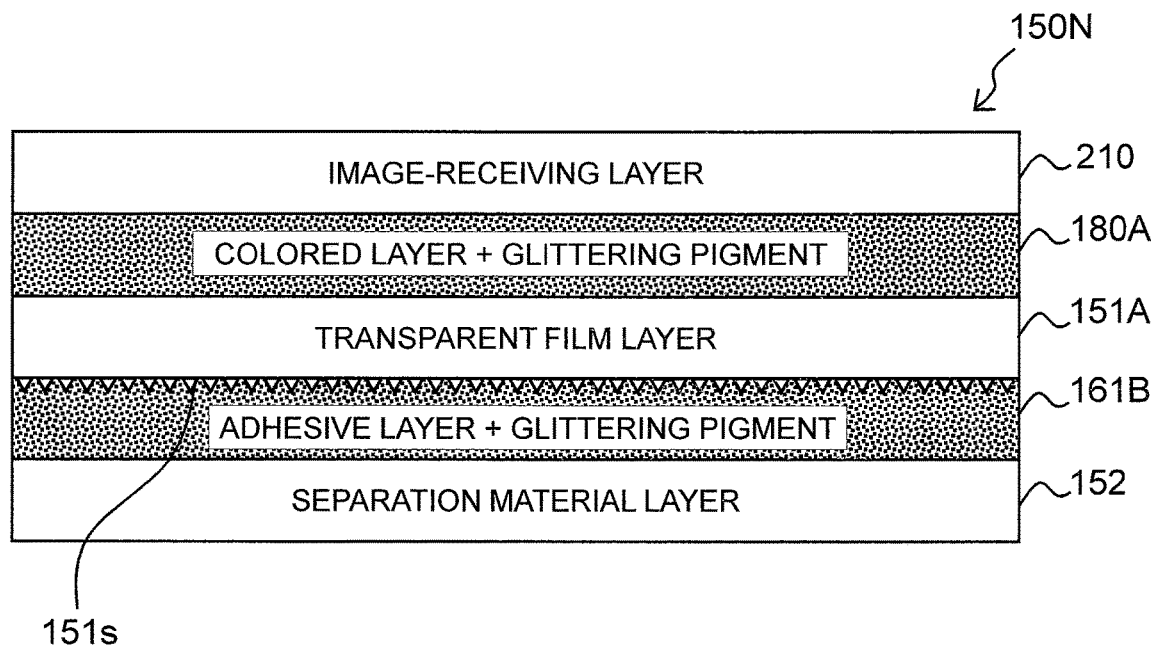

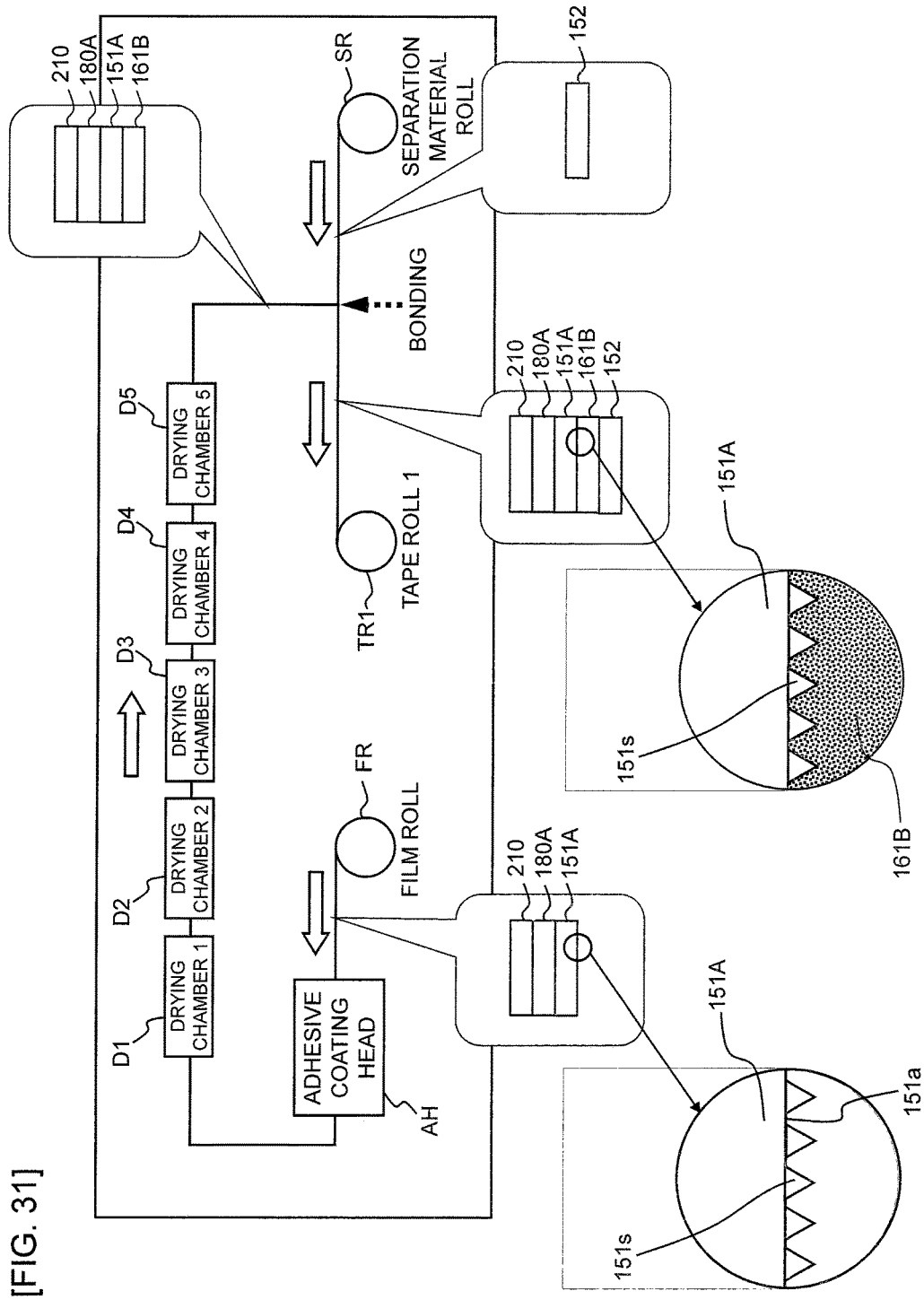
[FIG. 31]

[FIG. 32]
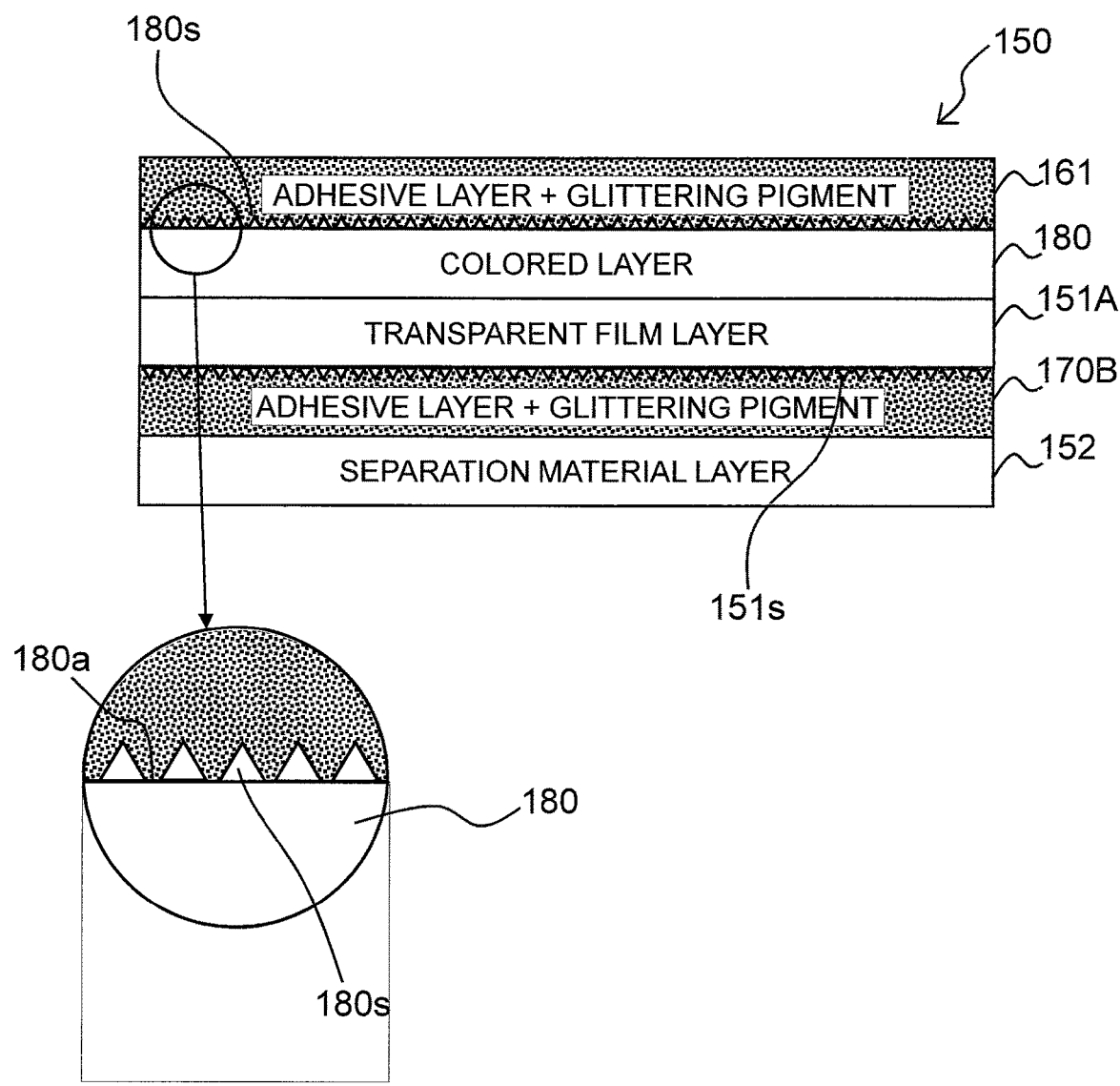

US 10,894,902 B2

ADHESIVE TAPE CARTRIDGE AND ADHESIVE TAPE ROLL

CROSS-REFERENCE TO RELATED APPLICATION

This is a continuation application of PCT/JP2017/033738, filed Sep. 19, 2017, which was not published under PCT article 21(2) in English.

BACKGROUND

Field

The present disclosure relates to an adhesive tape cartridge including an adhesive tape roll formed by winding an adhesive tape and the adhesive tape roll.

Description of the Related Art

An adhesive tape cartridge including an adhesive tape roll formed by winding an adhesive tape is already known. In a prior art, the adhesive tape has a layer structure including two adhesive layers (a first adhesive layer serving as a bonding adhesive layer and a second adhesive layer serving as an affixing adhesive layer) sandwiching a base film and a separation material layer (separation sheet).

In the adhesive tape having the layer structure, it is conceivable that a pigment is added to the bonding adhesive layer serving as an outermost layer for obtaining a desired color feeling in appearance, for example. In this case, it may be desired to use two types of pigments with the intention of particularly achieving development or shiny appearance of multiple colors. However, if these two types of pigments are mixed in one layer (the bonding adhesive layer), interference occurs between both pigments, and the effect of the pigments cannot sufficiently be produced.

Therefore, to divide these two types in separate layers, it is conceivable that two layers are newly disposed for respectively arranging the two types of pigments in the layers; however, in this case, increasing two layers results in an increase in overall thickness of the adhesive tape and an accompanying increase in the number of manufacturing steps.

SUMMARY

An object of the present disclosure is to provide an adhesive tape cartridge and an adhesive tape roll used for the same, capable of sufficiently producing respective effects of multiple pigments while suppressing increases in overall thickness of a tape and the number of manufacturing steps.

In order to achieve the above-described object, according to the present application, there is provided an adhesive tape cartridge comprising an adhesive tape roll that winds an adhesive tape around a predetermined axis in a housing, the adhesive tape comprising a base layer, a colored layer that is disposed on a first side of the base layer in a thickness direction and comprises a pigment added thereto, and a pigment-containing adhesive layer that is disposed on the first side of the colored layer in the thickness direction and comprises an adhesive to which a pigment is added.

In a first disclosure of the present application, for an ordinary layer structure including an adhesive layer, a colored layer, and a base layer, a pigment is added to the adhesive layer (a pigment-containing adhesive layer), and a pigment is also added to the colored layer. This has the following meaning.

Specifically, for example, in the case that it is desired to use two types of pigments with the intention of developing two types of pearl feeling (glittering feeling), if these pigments are mixed in one layer, interference occurs between both pigments, so that the effects of the pigments cannot sufficiently be produced. However, if two respective layers containing pigments are disposed separately from the three layers, an overall thickness of an adhesive tape is significantly increased, and the number of manufacturing steps is also significantly increased.

Therefore, in a first disclosure of the present application, first, one pigment is disposed in one adhesive layer (the pigment-containing adhesive layer), while the other pigment is disposed in the colored layer. By respectively arranging the two pigments in the separate layers in this way, the interference between both pigments due to mixing can be suppressed, and the effects of the pigments can sufficiently be produced.

BRIEF DESCRIPTION OF THE DRAWINGS

FIG. 1 is a perspective view showing an outer appearance on the front side of a print label producing apparatus to which an adhesive tape cartridge of a first embodiment of the present disclosure is attached.

FIG. 2 is a plan view showing an internal structure on the back side of an apparatus main body of the print label producing apparatus.

FIG. 3 is an explanatory view showing the layer configuration of each of a transparent print-receiving tape and a double-sided adhesive tape.

FIG. 4A is an explanatory view showing the layer configuration of a print tape.

FIG. 4B is an explanatory view showing the state where the print tape is affixed to an adherend.

FIG. 5A is an explanatory view showing the layer configuration of the double-sided adhesive tape without a colored layer thereof.

FIG. 5B is an explanatory view showing the state where the print tape using the double-sided adhesive tape without the colored layer is affixed to the adherend.

FIG. 6 is a view showing production steps for the double-sided adhesive tape.

FIG. 7 is a view showing production steps for the double-sided adhesive tape.

FIG. 8 is a graph showing the relation between the thickness of the adhesive layer and the adhesive force acquired when the volume ratio of a pigment in the adhesive layer is varied.

FIG. 9A is an explanatory view showing the layer configuration of the double-sided adhesive tape in a modification example where the pigment is also added to an adhesive layer on an affixation side.

FIG. 9B is an explanatory view showing the layer configuration of the double-sided adhesive tape in a modification example where the pigment is also added to the adhesive layer on the affixation side and the colored layer thereof is not formed.

FIG. 10 is a view showing production steps for the double-sided adhesive tape.

FIG. 11 is a view showing the production steps for the double-sided adhesive tape.

FIG. 12 is a plan view showing the internal structure on the back side of the apparatus main body of a print label producing apparatus to which an adhesive tape cartridge of a second embodiment of the present disclosure is attached.

FIG. 13 is an explanatory view showing the layer configurations of the transparent print-receiving tape and the double-sided adhesive tape.

FIG. 14 is an explanatory view showing the state where the print tape is affixed to an adherend.

FIG. 15 is an explanatory view showing a modification example where a solid pigment is avoided and only the glittering pigment is added to the colored layer.

FIG. 16 is a view showing production steps for the double-sided adhesive tape.

FIG. 17 is a view showing the production steps for the double-sided adhesive tape.

FIG. 18 is a plan view showing the internal structure on the back side of the apparatus main body of a print label producing apparatus in a modification example where a non-laminate type cartridge is used.

FIG. 19A is an explanatory view showing the layer configuration of the adhesive tape.

FIG. 19B is an explanatory view showing the layer configuration of the print tape.

FIG. 20 is a view showing production steps for the adhesive tape.

FIG. 21 is an explanatory view showing a modification example having a glittering pigment layer disposed instead of the colored layer.

FIG. 22A is an explanatory view showing a modification example without an image-receiving layer.

FIG. 22B is an explanatory view showing a modification example where the glittering pigment layer is disposed instead of the colored layer.

FIG. 23A is an explanatory view showing a modification example where the transparent film layer and the colored layer are replaced with each other.

FIG. 23B is an explanatory view showing a modification example where the glittering pigment layer is disposed therein instead of the colored layer.

FIG. 24A is an explanatory view showing a modification example where the image-receiving layer is further removed.

FIG. 24B is an explanatory view showing the modification example where the image-receiving layer is further removed.

FIG. 25 is an explanatory view showing the layer configuration of the double-sided adhesive tape included in an adhesive tape cartridge of a third embodiment of the present disclosure.

FIG. 26A is an explanatory view showing an effect achieved by protrusions disposed on a surface of a film layer.

FIG. 26B is an explanatory view showing the effect achieved by the protrusions disposed on the surface of the film layer.

FIG. 27 is a view showing production steps for a double-sided adhesive tape.

FIG. 28 is a view showing the production steps for the double-sided adhesive tape.

FIG. 29A is an explanatory view showing an example where protrusions are disposed on the surface of the film layer of the configuration in FIG. 9A.

FIG. 29B is an explanatory view showing an example where protrusions are disposed on the surface of the film layer of the configuration in FIG. 9B.

FIG. 30 is an explanatory view showing an example where protrusions are disposed on the surface of the film layer of the configuration in FIG. 23A.

FIG. 31 is a view showing production steps of an adhesion tape.

FIG. 32 is an explanatory view showing a modification example where protrusions are disposed on the surface of the colored layer.

DETAILED DESCRIPTION OF THE PREFERRED EMBODIMENTS

Embodiments of the present disclosure will be described below with reference to the drawings. When "upper", "lower", "front", "back", and "width" are used for a print label producing apparatus 1 in the following description, these correspond to the directions indicated by arrows properly shown in the drawings such as FIG. 1.

First Embodiment

The first embodiment of the present disclosure will be described with reference to FIG. 1-FIG. 5.

<Overall Structure of Print Label Producing Apparatus>

FIG. 1 and FIG. 2 show an example of a print label producing apparatus to which an adhesive tape cartridge of this embodiment is attached. In FIG. 1 and FIG. 2, the print label producing apparatus 1 is a handheld electronic device to be held by a hand of a user. The print label producing apparatus 1 includes an apparatus main body 2 and a cover 3 that is attached and detached to/from a back portion face of the apparatus main body 2.

The apparatus main body 2 includes a thin housing 2A having a flattened and substantially cuboidal shape that is elongated in the up-and-down direction. A liquid crystal display part 4 to display thereon print data, a setting screen, and the like is disposed in an upper portion of the front face of the housing 2A, and a keyboard part 5 to operate the label producing apparatus 1 is disposed on the lower side of the liquid crystal display part 4. In the keyboard part 5, a group of keys including character keys for characters, symbols, numbers, and the like, and various types of function keys is arranged. A cutting operation lever 6 to cut off a label tape with print is disposed in an upper portion of a side wall portion 2a on one side in the width direction (the left side in FIG. 1, the right side in FIG. 2) of the housing 2A.

<Label Producing Mechanism of Print Label Producing Apparatus>

As shown in FIG. 2, the apparatus main body 2 includes a label producing part 10 and a battery storage part 30. The label producing part 10 and the battery storage part 30 are partitioned from each other by a containing part 8 that has a control circuit board, a motor, and the like not shown contained therein. The battery storage part 30 includes a recess 32 having a rectangular shape, and plural recesses 36 that each are shallow in the up-and-down direction are disposed in a bottom portion 34 of the recess 32 along the width direction thereof. In the battery storage part 30, plural dry batteries not shown are stored at two levels each for the same number of dry batteries.

The label producing part 10 includes a recessed cartridge holder 12 that is disposed to occupy a large portion of a substantially upper half of the apparatus main body 2 and that is to attach and detach thereto/therefrom an adhesive tape cartridge 11 (hereinafter, properly referred to simply as "cartridge 11"), and a printing•feeding mechanism 13 disposed in an area that includes the other side in the width direction (the left side in FIG. 2) of the cartridge holder 12.

The cartridge 11 is a cartridge called what-is-called "laminate type cartridge" in this embodiment and, as shown in FIG. 2, includes, inside a housing 11A, an adhesive tape roll 14, a print-receiving tape roll 15, an ink ribbon roll 16, an ink ribbon take-up roller 17, and a transporting roller 18. The adhesive tape roll 14 includes a double-sided adhesive tape 150 wound around a spool 50 having a predetermined axis. As shown in an enlarged view in FIG. 2, the double-sided adhesive tape 150 includes an adhesive layer 161 having a glittering pigment described later added thereto, a colored layer 180, a film layer 151, an adhesive layer 170, and a separation material layer 152 that are stacked on each other in this order from the spool 50 positioned on the side of the center in the radial direction (corresponding to an upper side shown in FIG. 3 described later) toward an outer side in the radial direction (corresponding to a lower side shown in FIG. 3 described later). As shown in FIG. 2, the print-receiving tape roll 15 includes a transparent or a translucent print-receiving tape 110 wound around a spool 60.

The printing•feeding mechanism 13 includes a support shaft 19 of the adhesive tape roll 14, a support shaft 20 of the print-receiving tape roll 15, a support shaft 21 of the ink ribbon roll 16, a driving shaft 22 of the ink ribbon take-up roller 17, a thermal head 23, a platen roller 24, a driving shaft 25 of the transporting roller 18, a pressing roller 26, and the like. The platen roller 24 is together with the pressing roller 26 attached to a roll holder 27, and the positions of the platen roller 24 and the pressing roller 26 can be switched between their printing•feeding position (a position shown in FIG. 2) to be in contact with the thermal head 23 and the transporting roller 18, and their stand-by position (not shown) to be distant from the thermal head 23 and the transporting roller 18, on the basis of shaking of the roll holder 27.

When a print label is produced, the positions of the platen roller 24 and the pressing roller 26 are switched to their printing•feeding position. The platen roller 24 whose position is switched to the printing•feeding position is rotated by the driving by a driving shaft not shown on the side of the apparatus main body 2 and presses the print-receiving tape 110 fed out from the print-receiving tape roll 15 and an ink ribbon not shown fed out from the ink ribbon roll 16, to the thermal head 23. As a result, an ink of the ink ribbon is transfer-printed onto the print-receiving tape 110 due to reception of heat by the ink from the thermal head 23. As a result, a desired print R (see FIG. 3 and the like described later) is formed on the print-receiving tape 110 and the platen roller 24 transports the print-receiving tape 110 and the ink ribbon whose print formation comes to an end, toward the transporting roller 18. The ink ribbon whose printing comes to an end is thereafter separated from the print-receiving tape 110 to be taken up by the ink ribbon take-up roller 17.

On the other hand, the pressing roller 26 having its position switched to the printing•feeding position presses the print-receiving tape 110 transported by the platen roller 24 after the printing therefor comes to an end and the double-sided adhesive tape 150 fed out from the adhesive tape roll 14 to the transporting roller 18 that is rotated by the driving by the driving shaft 25. As a result, as shown in the enlarged view in FIG. 2 (see also FIG. 3 and FIG. 4 described later), the transporting roller 18 forms the print tape 100 by bonding the print-receiving tape 110 having the print R formed thereon and the double-sided adhesive tape 150 to each other, feeding the print tape 100 toward a label discharging exit 29 that is disposed on an upper end of the apparatus main body 2. At a predetermined time point at which the print tape 100 is discharged from the label discharging exit 29, the user manually operates the cutting operation lever 6 and, as a result, a cutter 28 arranged in the vicinity of the label discharging exit 29 operates to cut off the print tape 100. As a result, the print tape 100 having a desired length (that is, a print label) is formed.

FIG. 3 is an explanatory view showing the layer configurations of the print-receiving tape 110 and the double-sided adhesive tape 150.

As shown in FIG. 3, the double-sided adhesive tape 150 includes the film layer 151, the colored layer 180 disposed in contact with the upper side as shown of the film layer 151, the adhesive layer 161 disposed in contact with the upper side as shown of the colored layer 180, the adhesive layer 170 disposed in contact with the lower side as shown of the film layer 151, and the separation material layer 152 disposed in contact with the lower side as shown of the adhesive layer 170 and covering the adhesive layer 170.

This embodiment is characterized in that, in the above, the glittering pigment is added to the adhesive that constitutes the adhesive layer 161. In this case, the volume ratio of the glittering pigment in the adhesive layer 161 (the ratio thereof to the overall layer and, hereinafter, the same will be applied to all the embodiments and all modification examples) and the thickness tA of the adhesive layer 161 take any one of combinations (a)-(f) that are:

(a) the volume ratio of the glittering pigment that is equal to or greater than 1% and less than 5%, and the thickness tA of the adhesive layer 161 that is 15 μm to 100 μm;
(b) the volume ratio of the glittering pigment that is equal to or greater than 5% and less than 10%, and the thickness tA of the adhesive layer 161 that is 20 μm to 100 μm;
(c) the volume ratio of the glittering pigment that is equal to or greater than 10% and less than 15%, and the thickness tA of the adhesive layer 161 that is 25 μm to 100 μm;
(d) the volume ratio of the glittering pigment that is equal to or greater than 15% and less than 20%, and the thickness tA of the adhesive layer 161 that is 30 μm to 100 μm;
(e) the volume ratio of the glittering pigment that is equal to or greater than 20% and less than 25%, and the thickness tA of the adhesive layer 161 that is 35 μm to 100 μm; and
(f) the volume ratio of the glittering pigment that is equal to or greater than 25% and less than 30%, and the thickness tA of the adhesive layer 161 that is 40 μm to 100 μm.

The volume ratio can be calculated using, for example, the following technique. The glittering pigment-including adhesive whose volume and weight are measured is dissolved in a solvent to separate the glittering pigment using centrifugal separation. As a result, the weight of the glittering pigment is determined, and the volume of the glittering pigment is determined by measuring the absolute specific gravity of the glittering pigment particles. The volume of the adhesive can be determined by subtracting the volume of the glittering pigment from the volume of the glittering pigment-including adhesive. The area and the ratio of the pigment present in the cross-section of the adhesive layer can be determined by observing the cross-section thereof using an electron microscope or an optical microscope, and the volume ratio can be determined by conducting volume conversion by continuously increasing the cross-sections to be observed (the same will hereinafter be applied to the modification examples and the other embodiments described later).

The glittering pigment of the adhesive layer 161 has a transmittance equal to or greater than 20%. The thickness tA of the adhesive layer 161 is larger than a thickness tB of the adhesive layer 170. The sticking force of the adhesive layer 161 is equal to or greater than 3 [N]/10 [mm]. The sticking force (the adhesive force) is measured in accordance with JIS-Z0237. Simply described, the face for the measurement is affixed to a SUS 304 stainless steel plate and, after a specific time period elapses, the face and the plate are peeled at an angle of 180° from each other at a speed of 300 mm/min using a tensile testing machine to conduct the measurement (the same will hereinafter be applied to the modification examples and the other embodiments described later).

Especially, a glittering pigment having the Mohs hardness equal to or less than 5 may be used as the glittering pigment of the adhesive layer 161. In this case, preferably, the volume ratios of the adhesive and the glittering pigment in the adhesive layer 161, and the thickness tA of the adhesive layer 161 take any one of combinations (g)-(h) that are:
(g) the volume ratio of the glittering pigment that is equal to or greater than 1% and less than 10%, and the thickness tA of the adhesive layer 161 that is 15 µm to 30 µm; and
(h) the volume ratio of the glittering pigment that is equal to or greater than 10% and less than 20%, and the thickness to of the adhesive layer 161 that is 20 µm to 30 µm.

On the other hand, the print-receiving tape 110 has the print R formed as above on the surface of the side that faces the double-sided adhesive tape 150 (the lower side as shown). The print-receiving tape 110 is bonded to the double-sided adhesive tape 150 through the adhesive layer 161.

FIG. 4A shows the layer configuration of the print tape 100 that is formed by bonding the print-receiving tape 110 and the double-sided adhesive tape 150 to each other and FIG. 4B shows the state where the separation material layer 152 is peeled off from the print tape 100 and the print tape 100 is affixed to an adherend M by the adhesive layer 170. As a result of the bonding, as shown in FIG. 4A, the print tape 100 includes the print-receiving tape 110, the adhesive layer 161 (to which the glittering pigment is added), the colored layer 180, the film layer 151, the adhesive layer 170, and the separation material layer 152 that are stacked on each other in this order from the upper side as shown toward the lower side as shown.

As shown in FIG. 5, the above may be configured to have the adhesive layer 161 disposed in contact with the upper side as shown of the film layer 151 without disposing the colored layer 180 between the adhesive layer 161 and the film layer 151.

The separation material layer 152 is formed by, for example, coating a separation agent on a base. A paper sheet, a PET film, an OPP film, a polyethylene film, and the like are each usable as the base. A silicone resin, a polyethylene resin, and the like are each usable as the separation agent.

Adhesives such as a urethane resin-based, a silicone resin-based, a vinyl resin-based, a polyester resin-based, a synthetic rubber-based, a natural rubber-based, and an acrylic resin-based adhesives, and the like are each usable as the adhesive of the adhesive layer 161 and the adhesive layer 170.

A glittering pigment formed by coating a color material such as titanium oxide, iron oxide, or the like, or a solid pigment as the color material, on the surface of a core material such as lepidolite, glass, alumina, a metal, or the like is usable as the glittering pigment to be added to the adhesive layer 161. A glittering pigment creating a color using an interference of the reflected light of the core material without coating any color material on the core material may also be used in accordance with the color tone of the glittering pigment. The "glittering pigment" is the generic name of the pigments each having the glittering property as above and, for example, a pearl pigment, a metallic pigment, and the like are known.

An inorganic pigment such as an oxide and an organic pigment such as a textile printing pigment are each usable as the solid pigment in this case. For example, an oxide such as titanium dioxide or zinc flower; a hydroxide such as alumina hydrate or iron oxide yellow; a sulfide such as zinc sulfide or lithopone; a chromium oxide such as chrome yellow or molybdenum orange; a silicate such as white carbon or clay; a sulfate salt such as precipitating barium sulfate or baryta powder; a carbonate such as calcium carbonate or lead white; and, in addition, a ferrocyanide (ferric hexacyanoferrate), carbon (carbon black), and the like are each usable as the inorganic pigment. For example, textile printing pigments including a basic dye such as rhodamine lake or methyl violet lake, an acid dye such as quinoline yellow lake, a vat dye such as malachite green, and a mordant dye such as alizarin lake; azo pigments including a soluble azo such as carmine 6B, an insoluble azo such as disazo yellow, a condensed azo such as chromophthal yellow 3G, an azo complex salt such as nickel azo yellow, and a benzimidazolone azo such as permanent orange HL; a phthalocyanine pigment such as phthalocyanine blue; a condensed polycyclic pigment such as Flavan Slon yellow; a nitro-based pigment such as naphthol yellow S; a nitroso-based pigment such as pigronto green B; a day-night fluorescent pigment such as Lumogen yellow; and, in addition, alkali blue and the like are each usable as the organic pigment.

The material quality of the separation material layer 152, and the materials•components used in the separation agent, the adhesive, the glittering pigment, and the solid pigment are also commonly usable in the modification examples and the other embodiments described later.

Production steps for the double-sided adhesive tape 150 will be described with reference to FIG. 6-FIG. 7.

As shown in FIG. 6, the film layer 151 having the colored layer 180 already formed thereon using, for example, a known printing technique is fed out from a film roll FR and is supplied to an adhesive coating head AH. The adhesive having the above composition is coated on a face opposite to the face with the colored layer 180 of the film layer 151 by the adhesive coating head AH to establish a three-layer structure including the colored layer 180, the film layer 151, and the adhesive layer 170. The three-layer structure tape thereafter sequentially passes through a first drying chamber D1, a second drying chamber D2, a third drying chamber D3, a fourth drying chamber D4, and a fifth drying chamber D5 in this order to conduct a drying process therefor in five stages. The number of the drying chambers is not limited to five.

The separation material layer 152 separately fed out from a separation material roll SR is thereafter bonded to the adhesive layer 170 and, as a result, the three-layer structure tape turns into a four-layer structure tape including the colored layer 180, the film layer 151, the adhesive layer 170, and the separation material layer 152 to thereafter be wound in a first tape roll TR1.

As shown in FIG. 7, the four-layer structure tape including the colored layer 180, the film layer 151, the adhesive layer 170, and the separation material layer 152 is thereafter fed out from the first tape roll TR1 and, similarly to the above, is supplied to the adhesive coating head AH. The adhesive having the above composition (including the glittering pigment) is coated on the face on the side opposite to the side with the film layer 151 of the colored layer 180 by the adhesive coating head AH. As a result, the four-layer structure tape turns into a five-layer structure tape including the adhesive layer 161 (having the glittering pigment added thereto), the colored layer 180, the film layer 151, the adhesive layer 170, and the separation material layer 152 and, similarly to the above, this tape thereafter sequentially passes through the first to the fifth drying chambers D1-D5 to conduct the drying process therefor. As a result, the double-sided adhesive tape 150 is completed. The double-sided adhesive tape 150 completed in this manner is wound in a second tape roll TR2.

Advantages of First Embodiment

According to the first embodiment, in the layer structure including the adhesive layer 161, the film layer 151, the adhesive layer 170, and the separation material layer 152, the glittering pigment is added to the adhesive layer 161. As a result, compared to the technique of disposing one layer to develop the color in addition to the above layers, the thickness of the overall double-sided adhesive tape 150 can be reduced. As a result, the length of the tape capable of being wound in the double-sided adhesive tape roll 14 can be increased even in the limited space in the cartridge 11. Especially, the increase of the length of the tape can be realized without increasing the number of the layers only by adding the glittering pigment to the adhesive layer 161 in the prior art structure that includes the four layers of the adhesive layer 161, the film layer 151, the adhesive layer 170, and the separation material layer 161.

The desired glittering property can reliably be realized suppressing any degradation of the adhesiveness caused by the addition of the glittering pigment. This will be described with reference to FIG. 8.

The adhesive force (the sticking force) of the adhesive layer is degraded as the amount of the pigment added to the adhesive layer is increased. The thickness of the adhesive layer itself therefore needs to be increased as the amount of the pigment added to the adhesive layer is increased when acquisition of a desired adhesive force is attempted. FIG. 8 shows a finding acquired by the inventors through their studies on this tendency for the adhesive constituting the adhesive layer 161. The axis of abscissa therein represents the thickness [μm] and the axis of ordinate therein represents the adhesive force [N/10 mm] of the adhesive layer 161.

In FIG. 8, the results of the study is shown for four cases where the volume ratio (the volume percentage) of the pigment in the adhesive layer 161 was 5%, was 10%, was 15%, and was 20%.

When the volume ratio of the pigment was 5%, the adhesive force was 3.2 [N/10 mm] for the thickness of the adhesive layer 161 of 15 [μm], the adhesive force was 4 [N/10 mm] for the thickness of 20 [μm], the adhesive force was 5.1 [N/10 mm] for the thickness of 35 [μm], and the adhesive force was 6.8 [N/10 mm] for the thickness of 52 [μm].

When the volume ratio of the pigment was 10%, the adhesive force was 3.6 [N/10 mm] for the thickness of the adhesive layer 161 of 20 [μm], the adhesive force was 4.5 [N/10 mm] for the thickness of 35 [μm], and the adhesive force was 5.7 [N/10 mm] for the thickness of 52 [μm].

When the volume ratio of the pigment was 15%, the adhesive force was 2.8 [N/10 mm] for the thickness of the adhesive layer 161 of 20 [μm], the adhesive force was 3.2 [N/10 mm] for the thickness of 25 [μm], the adhesive force was 3.6 [N/10 mm] for the thickness of 35 [μm], and the adhesive force was 4.4 [N/10 mm] for the thickness of 52 [μm].

When the volume ratio of the pigment was 20%, the adhesive force was 2.5 [N/10 mm] for the thickness of the adhesive layer 161 of 20 [μm], the adhesive force was 2.7 [N/10 mm] for the thickness of 25 [μm], the adhesive force was 3.1 [N/10 mm] for the thickness of 30 [μm], the adhesive force was 3.2 [N/10 mm] for the thickness of 35 [μm], and the adhesive force was 3.7 [N/10 mm] for the thickness of 52 [μm].

As above, the property lines in the three cases each present a behavior of an increase associated with an increase of the thickness while the magnitudes of the overall adhesive forces are "the case of the pigment volume ratio of 5%">"the case of the pigment volume ratio of 10%">"the case of the pigment volume ratio of 15%">"the case of the pigment volume ratio of 20%", and it can therefore be seen that the adhesive force was degraded as the amount of the pigment added to the adhesive layer was increased. As a result, the thickness of the adhesive layer itself needs to be increased as the amount of the added pigment is increased when, for example, acquisition of a desired adhesive force as the adhesive force is attempted. For example, it can be seen in this example that, when it is desired to acquire 3 [N/10 mm] that is the adhesive force to be the ordinary standard value (see the dotted line), the thickness of the adhesive layer 161 of 15 [μm] is sufficient for the pigment volume ratio of 5% while the thickness of the adhesive layer 161 of about 20 [μm] is necessary for the pigment volume ratio of 10%, the thickness of the adhesive layer 161 of about 25 [μm] is necessary for the pigment volume ratio of 15%, and the thickness of the adhesive layer 161 of about 30 [μm] is necessary for the pigment volume ratio of 20%.

In accordance with this behavior, in this embodiment, the thickness of the adhesive layer 161 is increased as the volume ratio of the glittering pigment in the adhesive in the adhesive layer 161 is increased like:

the thickness tA of the adhesive layer 161 set to be equal to or larger than 15 [μm] when the volume ratio of the glittering pigment in the adhesive layer is equal to or greater than 1% and less than 5%;

the thickness tA of the adhesive layer 161 set to be equal to or larger than 20 [μm] when the volume ratio of the glittering pigment in the adhesive layer is equal to or greater than 5% and less than 10%;

the thickness tA of the adhesive layer 161 set to be equal to or larger than 25 [μm] when the volume ratio of the glittering pigment in the adhesive layer is equal to or greater than 10% and less than 15%;

the thickness tA of the adhesive layer 161 set to be equal to or larger than 30 [μm] when the volume ratio of the glittering pigment in the adhesive layer is equal to or greater than 15% and less than 20%;

the thickness tA of the adhesive layer 161 set to be equal to or larger than 35 [μm] when the volume ratio of the glittering pigment in the adhesive layer is equal to or greater than 20% and less than 25%; and the thickness tA of the adhesive layer 161 set to be equal to or larger than 40 [μm] when the volume ratio of the glittering pigment in the adhesive layer is equal to or greater than 25% and less than 30%. As a result, the desired glittering property can reliably be realized suppressing any degradation of the adhesiveness (the sticking property) of the adhesive layer 161 caused by the addition of the glittering pigment.

In this embodiment, especially, the colored layer 180 is disposed between the film layer 150 and the adhesive layer 161. As a result, the color development function by the glittering pigment of the adhesive layer 161 and the color development function by the colored layer 180 can sufficiently be achieved (compared to the case where these functions are caused to be present in one layer as a mixture). Especially, both of the coloring expression and the glittering expression can visually be recognized when seen from the one side in the thickness direction (see a dotted arrow "a" in FIG. 4B), by establishing the arrangement of the functions that is the color development by the glittering pigment in the adhesive layer 161 on the one side in the thickness direction (the upper side in FIG. 3, FIG. 4, and the like) and the color development by the colored layer 180 on the other side in the thickness direction (the lower side in FIG. 3, FIG. 4, and the like).

For example, when the film layer 151 itself has a color, both of the coloring expression and the glittering expression can visually be recognized without disposing the colored layer 180 between the adhesive layer 161 and the film layer 151 as shown in FIG. 5A.

In this embodiment, especially, the thickness tA of the adhesive layer 161 is larger than a thickness tB of the adhesive layer 170 and, as a result, any degradation of the adhesiveness caused by the addition of the glittering pigment in the adhesive layer 161 can be compensated and reliable adhesiveness can be acquired.

In this embodiment, especially, the adhesive force of the adhesive layer 170 is equal to or larger than 3 [N]/10 [mm] and, as a result, reliable adhesiveness for the adherend M by the adhesive layer 170 can be secured.

In this embodiment, especially, the Mohs hardness of the glittering pigment in the adhesive layer 161 is equal to or less than 5. As a result, any wear of a cutter blade included in the cutter 28 can be suppressed when the tape is used in the print label producing apparatus 1 and is cut off by the cutter 28.

This embodiment also has a technical meaning as follows. A pearl pigment using mica as its parent material, metallic pigments each using a metal such as aluminum, and a pigment using alumina as its parent material are present each as the glittering pigment. The hardness of each of the pigments differs in accordance with the parent material thereof. In accordance with this, the degree of its influence on the cutter blade also differs. Taking into consideration the durability of the cutter, mica has low Mohs hardness that is about 2.5 to about 3, and is very advantageous. On the contrary, alumina has very high Mohs hardness and, as a result, its load on the cutter is significant and the wear of the blade starts in an early stage. As a result, mica is not advantageous taking into consideration the durability of the printer.

Furthermore, in addition to the restriction on the Mohs hardness, the glittering expression and the adhesiveness can be secured suppressing any wear of the cutter blade by additionally imposing the restrictions on the volume ratio of the glittering pigment to the adhesive 100 and the thickness tA of the adhesive layer 161 like, setting the thickness tA of the adhesive layer 161 to be equal to or larger than 15 [μm] when the volume ratio of the glittering pigment is equal to or greater than 1% and less than 10%, and setting the thickness tA of the adhesive layer 161 to be equal to or larger than 20 [μm] when the volume ratio of the glittering pigment is equal to or greater than 10% and less than 20%.

Modification Examples of First Embodiment

The first embodiment is not limited to the above disclosure and various modifications can be made thereto within the scope not departing from the gist and the technical idea thereof.

(1-1) Addition of Pigment Also to Adhesive Layer on Affixation Side

FIG. 9A shows the layer configurations of the print-receiving tape 110 and the double-sided adhesive tape 150 in this modification example, corresponding to FIG. 3 of the first embodiment.

As shown in FIG. 9A, the double-sided adhesive tape 150 in this modification example includes a transparent film layer 151A that is transparent or translucent (having a transmittance, for example, equal to or greater than 20%), the colored layer 180 disposed in contact with the upper side as shown of the transparent film layer 151A, the adhesive layer 161 disposed in contact with the upper side as shown of the colored layer and having the glittering pigment added thereto similarly to the first embodiment, an adhesive layer 170A disposed in contact with the lower side as shown of the transparent film layer 151A and having the solid pigment added thereto, and the separation material layer 152 disposed in contact with the lower side as shown of the adhesive layer 170A and covering the adhesive layer 170.

Similarly to the first embodiment, this modification example is characterized in that the volume ratios of the adhesive and the glittering pigment in the adhesive layer 161, and the thickness tA of the adhesive layer 161 take any one of combinations (a)-(f) that are:
(a) the volume ratio of the glittering pigment that is equal to or greater than 1% and less than 5%, and the thickness tA of the adhesive layer 161 that is 15 μm to 100 μm;
(b) the volume ratio of the glittering pigment that is equal to or greater than 5% and less than 10%, and the thickness tA of the adhesive layer 161 that is 20 μm to 100 μm;
(c) the volume ratio of the glittering pigment that is equal to or greater than 10% and less than 15%, and the thickness tA of the adhesive layer 161 that is 25 μm to 100 μm;
(d) the volume ratio of the glittering pigment that is equal to or greater than 15% and less than 20%, and the thickness tA of the adhesive layer 161 that is 30 μm to 100 μm;
(e) the volume ratio of the glittering pigment that is equal to or greater than 20% and less than 25%, and the thickness tA of the adhesive layer 161 that is 35 μm to 100 μm; and
(f) the volume ratio of the glittering pigment that is equal to or greater than 25% and less than 30%, and the thickness tA of the adhesive layer 161 that is 40 μm to 100 μm.

The glittering pigment of the adhesive layer 161 has a transmittance equal to or greater than 20%. The adhesive force of the adhesive layer 170 is equal to or greater than 3 [N]/10 [mm].

On the other hand, in this modification example, similarly to the first embodiment, the print-receiving tape 110 (not shown) has the print R formed on the surface of the side that faces the double-sided adhesive tape 150 (the lower side in FIG. 9) and is bonded to the double-sided adhesive tape 150 through the adhesive layer 161.

As shown in FIG. 9B, this modification example may be configured for the adhesive layer 161 to be disposed in contact with the upper side as shown of the transparent film layer 151A without disposing the colored layer 180 between the adhesive layer 161 and the transparent film layer 151A.

Production steps for the double-sided adhesive tape 150 will be described with reference to FIG. 10-FIG. 11.

As shown in FIG. 10, the transparent film layer 151A having the colored layer 180 already formed thereon using, for example, a known printing technique is fed out from the film roll FR and is supplied to the adhesive coating head AH. The adhesive having the above composition (including the solid pigment) is coated on the face opposite to the face with the colored layer 180 of the transparent film layer 151A by the adhesive coating head AH to establish a three-layer structure of the colored layer 180, the transparent film layer 151A, and the adhesive layer 170A (having the solid pigment added thereto). The three-layer structure tape thereafter sequentially passes through the first drying chamber D1, the second drying chamber D2, the third drying chamber D3, the fourth drying chamber D4, and the fifth drying chamber D5 in this order and, as a result, the drying process is conducted therefor in the five stages. The number of the drying chambers is not limited to five.

The separation material layer 152 separately fed out from the separation material roll SR is thereafter bonded to the adhesive layer 170A and, as a result, the three-layer structure tape turns into a four-layer structure tape including the colored layer 180, the transparent film layer 151A, the adhesive layer 170A, and the separation material layer 152 to thereafter be wound in the first tape roll TR1.

As shown in FIG. 11, the four-layer structure tape including the colored layer 180, the transparent film layer 151A, the adhesive layer 170A, and the separation material layer 152 is thereafter fed out from the first tape roll TR1 and, similarly to the above, is supplied to the adhesive coating head AH. The adhesive having the above composition (including the glittering pigment) is coated on the face on the side opposite to the side with the transparent film layer 151A of the colored layer 180 by the adhesive coating head AH to establish a five-layer structure including the adhesive layer 161 (having the glittering pigment added thereto), the colored layer 180, the transparent film layer 151A, the adhesive layer 170A (having the solid pigment added thereto), and the separation material layer 152. Similarly to the above, the tape thereafter sequentially passes through the first to the fifth drying chambers D1-D5 to conduct the drying process therefor to complete the double-sided adhesive tape 150. The adhesive tape 150 completed in this manner is wound in the second tape roll TR2.

In this modification example, the same advantages as that of the first embodiment is achieved. In the layer structure including the adhesive layer 161, the transparent film layer 151A, the adhesive layer 170A, and the separation material layer 152, the pigments are added to the adhesive layers 161 and 170A. As a result, compared to the technique of disposing one layer to develop the color in addition to the above, the thickness of the overall double-sided adhesive tape 150 can be reduced. As a result, the length of the tape capable of being wound in the double-sided adhesive tape roll 14 can be increased even in a limited space in the cartridge 11.

Similarly to the first embodiment, the thickness of the adhesive layer 161 is increased as the volume ratio of the glittering pigment in the adhesive in the adhesive layer 161 is increased, as the conditions of the above (a)-(f). As a result, the desired glittering property can reliably be realized suppressing any degradation of the adhesiveness (the sticking property) of the adhesive layer 161 caused by the addition of the glittering pigment.

In this modification example, especially, the two pigments (the glittering pigment and the solid pigment) are respectively assigned to the adhesive layer 161 and the adhesive layer 170A to be arranged therein. As a result, the effect achieved by each of the pigments (especially, the glittering expression by the glittering pigment) can sufficiently be achieved suppressing any interference between the pigments generated when these pigments are present in one layer as a mixture. Especially, the arrangement for the glittering pigment to be on the upper side in FIG. 9A and for the solid pigment to be on the lower side in FIG. 9A is established and, as a result, both of the coloring expression and the glittering expression can visually be recognized when seen from the one side in the thickness direction.

As shown in FIG. 9B, the configuration not disposing the colored layer 180 between the adhesive layer 161 and the transparent film layer 151A, that is, the configuration disposing the adhesive layer 161 in contact with the upper side as shown of the transparent film layer 151A may be employed. In this case, the transparent film layer 151A is a transparent or a translucent layer. As a result, when the transmissivity of the pigment of the adhesive layer 170A is high (for example, the transmittance equal to or greater than 20%), the outer appearance property utilizing the color of the raw material of the adherend M (see FIG. 4B, FIG. 5B above) can be established by not disposing the colored layer.

Second Embodiment

The second embodiment of the present disclosure will be described with reference to FIG. 12-FIG. 15 and the like. Components equivalent to those in the first embodiment and its modification examples are given the same reference numerals and will not again be descried or will simply be described.

Similarly to the first embodiment, this embodiment is an embodiment for the case where a what-is-called laminate type cartridge is used. FIG. 12 shows a plan view showing the internal structure on the back side of the apparatus main body of the print label producing apparatus in the second embodiment, corresponding to FIG. 2 of the first embodiment. In FIG. 12, the double-sided adhesive tape 150 wound in the adhesive tape roll 14 included in the housing 11A of the cartridge 11 of this embodiment includes the adhesive layer 161 having the pigment added thereto (in this example, the glittering pigment and the same will hereinafter be applied), a colored layer 190 having the pigments added thereto (in this example, the glittering pigment and the solid pigment and the same will hereinafter be applied), the film layer 151, the adhesive layer 170, and the separation material layer 152 that are stacked on each other in this order from the spool 50 positioned on the side of the center in the radial direction (corresponding to the upper side shown in FIG. 13 described later) toward an outer side in the radial direction (corresponding to the lower side shown in FIG. 13 described later), as shown in an enlarged view in FIG. 12. Similarly to the above, as shown in FIG. 12, the print-receiving tape roll 15 includes, for example, a transparent or a translucent print-receiving tape 110 that is wound around the spool 60. The housing 11A also includes the ink ribbon roll 16 same as above.

<Details of Layer Configuration of Tape>

FIG. 13 is an explanatory view showing the layer configurations of the print-receiving tape 110 and the double-sided adhesive tape 150.

As shown in FIG. 13, the double-sided adhesive tape 150 includes the film layer 151, the colored layer 190 disposed in contact with the upper side as shown of the film layer 151 and having the glittering pigment and the solid pigment added thereto, the adhesive layer 161 disposed in contact with the upper side as shown of the colored layer 190 and having the glittering pigment added thereto, the adhesive layer 170 disposed in contact with the lower side as shown of the film layer 151, and the separation material layer 152 disposed in contact with the lower side as shown of the adhesive layer 170 and covering the adhesive layer 170.

In this case, this embodiment is characterized in that the thickness to of the adhesive layer 161 is 15 [μm] to 50 [μm]

and is larger than the thickness tB of the adhesive layer 170 and a thickness tC of the colored layer 190.

The volume ratio of the glittering pigment in the adhesive layer 161 is 1% to 40% and is less than the volume ratios of the glittering pigment and the solid pigment in the colored layer 190 (the technique for measuring the volume ratio is same as above). The glittering pigment of the adhesive layer 161 has a transmittance equal to or greater than 20%.

The average particle diameter of the glittering pigment in the adhesive layer 161 is 5 μm to 100 μm and is larger than the average particle diameters of the glittering pigment and the solid pigment in the colored layer 190.

The average particle diameters can each be measured using a known laser diffraction scattering method. The average particle diameter can be measured using, for example, LA-960 manufactured by Horiba Ltd. (the same will hereinafter be applied to modification examples and other embodiments described later).

The adhesive force of the adhesive layer 161 is equal to or greater than 3 [N]/10 [mm] (the technique for measuring the adhesive force is same as above).

The print-receiving tape 110 has the print R formed as above on the surface of the side (that is the lower side as shown) that faces the double-sided adhesive tape 150. The print-receiving tape 110 is bonded to the double-sided adhesive tape 150 through the adhesive layer 161.

FIG. 14A shows the layer configuration of the print tape 100 that is formed by bonding the print-receiving tape 110 and the double-sided adhesive tape 150 to each other, and FIG. 14B shows the state where the separation material layer 152 is peeled off from the print tape 100 and the print tape 100 is affixed to an adherend M by the adhesive layer 170. As a result of the bonding, as shown in FIG. 14A, the print tape 100 includes the print-receiving tape 110, the adhesive layer 161 (to which the glittering pigment is added), the colored layer 190 (to which the glittering pigment and the solid pigment are added), the film layer 151, the adhesive layer 170, and the separation material layer 152 that are stacked on each other in this order from the upper side as shown toward the lower side as shown.

As shown in FIG. 15, the above may be configured to have a colored layer 190A to which only the glittering pigment is added (without the solid pigment) instead of the colored layer 190 to which the glittering pigment and the solid pigment are added.

Production steps for the double-sided adhesive tape 150 will be described with reference to FIG. 16-FIG. 17.

As shown in FIG. 16, the film layer 151 having the colored layer 190 already formed thereon using, for example, a known printing technique is fed out from a film roll FR and is supplied to an adhesive coating head AH. The adhesive having the above composition is coated on a face opposite to the face with the colored layer 180 of the film layer 151 by the adhesive coating head AH to establish a three-layer structure including the colored layer 190, the film layer 151, and the adhesive layer 170. The three-layer structure tape thereafter passes through a first drying chamber D1, a second drying chamber D2, a third drying chamber D3, a fourth drying chamber D4, and a fifth drying chamber D5 in this order to conduct a drying process therefor in five stages. The number of the drying chambers is not limited to five.

The separation material layer 152 separately fed out from a separation material roll SR is thereafter bonded to the adhesive layer 170 and, as a result, the three-layer structure tape turns into a four-layer structure tape including the colored layer 190, the film layer 151, the adhesive layer 170, and the separation material layer 152 to thereafter be wound in a first tape roll TR1.

As shown in FIG. 17, the four-layer structure tape including the colored layer 190, the film layer 151, the adhesive layer 170, and the separation material layer 152 is thereafter fed out from the first tape roll TR and, similarly to the above, is supplied to the adhesive coating head AH. The adhesive having the above composition (including the glittering pigment) is coated on the face on the side opposite to the side with the film layer 151 of the colored layer 190 by the adhesive coating head AH. As a result, the tape has a five-layer structure including the adhesive layer 161 (to which the glittering pigment is added), the colored layer 190, the film layer 151, the adhesive layer 170, and the separation material layer 152 and, similarly to the above, the tape thereafter sequentially passes through the first to the fifth drying chambers D1-D5 to conduct the drying process therefor. As a result, the double-sided adhesive tape 150 is completed. The double-sided adhesive tape 150 completed in this manner is wound in a second tape roll TR2.

Advantages of Second Embodiment

As above, in the second embodiment, for the layer structure including the adhesive layer 161, the colored layer 190, and the film layer 151, the glittering pigment is added to the adhesive layer 161 and the glittering pigment is also added to the colored layer 190. This has the following meaning.

For example, in the case where it is desired to use two types of glittering pigment intending to develop colors having two types of pearly expression (the glittering expression), when the pigments are added to one layer being mixed with each other, an interference is generated between the pigments and, as a result, the effect of each of the pigments cannot sufficiently be achieved. The thickness of the overall adhesive tape 150 is however significantly increased and the production steps therefor are also significantly increased when the layers separately including the two glittering pigments are disposed in addition to the three layers.

In the second embodiment, the one glittering pigment is arranged in the adhesive layer 161 and the other glittering pigment is arranged in the colored layer 190. Any interference between the pigments caused by their presence as a mixture can be suppressed and the effect of each of the pigments can sufficiently be achieved suppressing any increase of the thickness of the overall adhesive tape 150 and any increase of the production steps, by arranging the two glittering pigments each being assigned to a layer different from that of each other.

In this embodiment, especially, the thickness tA of the adhesive layer 161 is larger than the thickness tB of the adhesive layer 170. As a result, any degradation of the adhesiveness caused by the addition of the glittering pigment in the adhesive layer 161 can be compensated and reliable adhesiveness can be acquired. In this case, the thickness tA of the adhesive layer 161 is 15 μm to 50 μm. The desired glittering property can reliably be realized suppressing any degradation of the adhesiveness caused by the addition of the glittering pigment, by setting the thickness of the adhesive layer 161 to be at least equal to or larger than 15 μm.

In this embodiment, especially, the thickness tA of the adhesive layer 161 is larger than the thickness tC of the adhesive layer 190. As a result, any degradation of the adhesiveness caused by the addition of the glittering pigment in the adhesive layer 161 can reliably be suppressed.

In this embodiment, especially, the volume ratio of the glittering pigment in the adhesive layer 161 is 1% to 40%. The desired glittering property can reliably be realized suppressing any degradation of the adhesiveness caused by the addition of the glittering pigment, by suppressing the volume ratio of the glittering pigment in the adhesive in the adhesive layer 161 to up to 40%.

In this embodiment, especially, the volume ratio of the glittering pigment in the adhesive layer 161 is greater than the volume ratios of the glittering pigment and the solid pigment in the colored layer 190. As a result, any degradation of the adhesiveness caused by the addition of the glittering pigment in the adhesive layer 161 can reliably be suppressed. The glittering pigment cannot be added so much when the colored layer 190 is produced using the printing step as described with reference to FIG. 16 while, in this embodiment, the volume ratios of the glittering pigment and the solid pigment in the colored layer 190 are each set to be less than that of the adhesive layer 161. As a result, the colored layer 190 can smoothly be produced using the printing step.

In this embodiment, especially, the average particle diameter of the glittering pigment in the adhesive layer 161 is 5 μm to 100 μm and is larger than the average particle diameters of the glittering pigment and the solid pigment in the colored layer 190. This has the following meaning. As above, any glittering pigment and any solid pigment each having a very large particle diameter cannot be used when the colored layer 190 is produced using the printing step. In accordance with this, in this embodiment, the colored layer 190 can smoothly be produced using the printing step, by setting the particle diameters of the glittering pigment and the solid pigment in the colored layer 190 to be smaller than that of the adhesive layer 161. For the five-layer configuration including the adhesive layer 170, when seen from the one side in the thickness direction (the upper side in, for example, FIG. 13, FIG. 14), the pigment having a large particle diameter is positioned on the side close to the observer and the pigment having a small particle diameter is positioned on the side distant from the observer (see a dotted line arrow "a" in FIG. 14). As a result, the glittering expression and the depth expression that are especially effective can be achieved.

The adhesive force of the adhesive layer 170 is equal to or greater than 3 [N]/10 [mm]. As a result, reliable adhesiveness by the adhesive layer 170 for the adherend M can be secured.

Modification Example of Second Embodiment

The second embodiment is not limited to the above disclosure and various modifications can be made thereto within the scope not departing from the gist and the technical idea thereof. Modification examples thereof will sequentially be described below.

(2-1) Application to Non-Laminate Type Cartridge

Different from the first embodiment and the second embodiment that use the laminate type cartridge 11, the cartridge called what-is-called "non-laminate type" (more particularly, "receptor type") cartridge is used in this embodiment.

FIG. 18 shows a plan view showing the internal structure on the back side of the apparatus main body of the print label producing apparatus in this modification example, corresponding to FIG. 12 of the second embodiment. In FIG. 18, the cartridge 11 used in this modification example includes, inside the housing 11A, the adhesive tape roll 14 (whose detailed layer configuration will be descried later), the ink ribbon roll 16, the ink ribbon take-up roller 17, and the transporting roller 18.

The adhesive tape roll 14 includes an adhesive tape 150N in relation to this modification example wound around the spool 50. As shown in an enlarged view in FIG. 18, the adhesive tape 150N includes the image-receiving layer 210, the transparent film layer 151A that is transparent or translucent similarly to the above (having the transmittance, for example, equal to or less than 20%), the colored layer 180A having the glittering pigment added thereto, the adhesive layer 161 having the glittering pigment added thereto similarly to the above, and the separation material layer 152 that are stacked on each other in this order from the spool 50 positioned on the side of the center in the radial direction (corresponding to the upper side shown in FIG. 19 described later) toward the outer side in the radial direction (corresponding to the lower side shown in FIG. 19 described later).

<Details of Layer Configuration of Tape>

FIG. 19A is an explanatory view showing the layer configurations of the adhesive tape 150N and a print tape 100N.

As shown in FIG. 19A, the adhesive tape 150N includes the transparent film layer 151A, the image-receiving layer 210 disposed in contact with the upper side as shown of the transparent film layer 151A, the colored layer 180A disposed in contact with the lower side as shown of the transparent film layer 151A and having the glittering pigment added thereto, the adhesive layer 161 disposed in contact with the lower side as shown of the colored layer 180A and having the glittering pigment added thereto, and the separation material layer 152 disposed in contact with the lower side as shown of the adhesive layer 161 and covering the adhesive layer 161.

Similarly to the second embodiment, in this modification example, the thickness to of the adhesive layer 161 is 15 [μm] to 50 [μm] and is larger than the thickness tC of the colored layer 180A.

The volume ratio of the glittering pigment to the adhesive 100 in the adhesive layer 161 is 1% to 40% and is greater than the volume ratio of the glittering pigment in the colored layer 180A.

The average particle diameter of the glittering pigment in the adhesive layer 161 is 5 [μm] to 100 [μm] and is larger than the average particle diameter of the glittering pigment in the colored layer 180A.

The adhesive force of the adhesive layer 161 is equal to or greater than 3 [N]/10 [mm].

In this modification example, the image-receiving layer 210 also has a transmittance equal to or greater than 20%.

FIG. 19B shows the layer configuration of the print tape 100N whose image-receiving layer 210 of the adhesive tape 150N has the print R formed thereon.

Production steps for the adhesive tape 150N will be described with reference to FIG. 20.

As shown in FIG. 20, the transparent film layer 151A having the image-receiving layer 210 and the colored layer 180A already formed thereon using, for example, a known printing technique is fed out from the film roll FR and is supplied to the adhesive coating head AH. The adhesive having the above composition (including the glittering pigment) is coated on the face opposite to the face with the transparent film layer 151A of the colored layer 180A by the adhesive coating head AH to establish a four-layer structure including the image-receiving layer 210, the transparent film layer 151A, the colored layer 180A, and the adhesive layer 161 (having the glittering pigment added thereto). The four-layer structure tape thereafter passes through the first drying chamber D1, the second drying chamber D2, the third drying chamber D3, the fourth drying chamber D4, and the fifth drying chamber D5 in this order to conduct the drying process therefor in the five stages. The separation material layer 152 separately fed out from the separation material roll SR is thereafter bonded to the adhesive layer 161 and, as a result, the four-layer structure tape is turned into the completed adhesive tape 150N that has a five-layer structure of the image-receiving layer 210, the transparent film layer 151A, the colored layer 180, the adhesive layer 161, and the separation material layer 152. The adhesive tape 150N completed in this manner is wound in the first tape roll TR1.

As shown in FIG. 21, the above may be configured to have a glittering pigment layer 180AA disposed therein instead of the colored layer 180A to which the glittering pigment is added.

As shown in FIG. 22A the image-receiving layer 210 may be removed from the configuration shown in FIG. 19B or, as shown in FIG. 22B, the above may be configured to have the glittering pigment layer 180AA disposed therein instead of the colored layer 180A to which the glittering pigment is added.

In this modification example, the same advantages as that of the second embodiment can be achieved. The one glittering pigment is arranged in the adhesive layer 161 and the other glittering pigment is arranged in the colored layer 180A. Any interference between the pigments caused by their presence as a mixture can be suppressed and the effect of each of the pigments can sufficiently be achieved suppressing any increase of the thickness of the overall adhesive tape 150N and any increase of the production steps, by arranging the two glittering pigments by assigning each thereof to a layer different from that of each other.

The thickness tA of the adhesive layer 161 is 15 µm to 50 µm. The desired glittering property can reliably be realized suppressing any degradation of the adhesiveness caused by the addition of the glittering pigment by setting the thickness of the adhesive layer 161 to be at least equal to or larger than 15 µm. The thickness tA of the adhesive layer 161 is larger than the thickness tC of the colored layer 180A. As a result, any degradation of the adhesiveness caused by the addition of the glittering pigment can reliably be suppressed.

Similarly to the second embodiment, the volume ratio of the glittering pigment to the adhesive 100 in the adhesive layer 161 is 1% to 40%. The desired glittering property can reliably be realized suppressing any degradation of the adhesiveness caused by the addition of the glittering pigment, by suppressing the volume ratio of the glittering pigment in the adhesive in the adhesive layer 161 to up to 40%.

The volume ratio of the glittering pigment in the adhesive layer 161 is greater than the volume ratio of the glittering pigment in the colored layer 180A. As a result, any degradation of the adhesiveness caused by the addition of the glittering pigment in the adhesive layer 161 can reliably be suppressed. The glittering pigment cannot be added so much when the colored layer 180A is produced using the printing step as described with reference to FIG. 20 while, in this modification example, the volume ratio of the glittering pigment in the colored layer 180A is set to be less than that of the adhesive layer 161. As a result, the colored layer 180A can smoothly be produced using the printing step.

The average particle diameter of the glittering pigment in the adhesive layer 161 is 5 µm to 100 µm and is larger than the average particle diameters of the glittering pigment in the colored layer 180A. The colored layer 180A can smoothly be produced using the printing step, by setting the particle diameter of the glittering pigment in the colored layer 180A to be smaller than that of the adhesive layer 161.

The adhesive force of the adhesive layer 161 is equal to or greater than 3 [N]/10 [mm]. As a result, reliable adhesiveness by the adhesive layer 161 for the adherend M can be secured.

(2-2) Replacement of Transparent Film Layer and Colored layer with Each Other

As shown in FIG. 23A, the image-receiving layer 210, the colored layer 180A, the transparent film layer 151A, the adhesive layer 161, and the separation material layer 152 may be stacked on each other in this order from the upper side as shown (the other side in the thickness direction) toward the lower side as shown (the one side in the thickness direction) by replacing the transparent film layer 151A and the colored layer 180A with each other in the layer configuration of the adhesive tape 150N shown in FIG. 19A. As shown in FIG. 23B, in the layer configuration of the adhesive tape 150N shown in FIG. 23A, this may be configured to have the glittering pigment layer 180AA disposed therein instead of the colored layer 180A to which the glittering pigment is added.

As shown in FIG. 24A, the image-receiving layer 210 may be removed from the configuration shown in FIG. 23A or, as show in FIG. 24B, the above may be configured to have the glittering pigment layer 180AA disposed therein instead of the colored layer 180A to which the glittering pigment is added. In these cases, the same advantages as above is achieved.

Third Embodiment

The third embodiment of the present disclosure will be described with reference to FIG. 25 and the like. Components equivalent to those of the first and the second embodiments, and the modification examples thereof are given the same reference numerals and will not again be described or will simply be described.

Similarly to the first embodiment, this embodiment is an embodiment for the case where the what-is-called laminate type cartridge is used. Though not shown, similarly to FIG. 2, the cartridge 11 used in this embodiment includes, inside the housing 11A, the adhesive tape roll 14, the print-receiving tape roll 15, the ink ribbon roll 16, the ink ribbon take-up roller 17, and the transporting roller 18. The adhesive tape roll 14 includes the double-sided adhesive tape 150 in relation to this embodiment wound around the spool 50.

The double-sided adhesive tape 150 of this embodiment includes, in the cartridge 11, the adhesive layer 161 to which the glittering pigment is added, the film layer 151, the adhesive layer 170, and the separation material layer 152 that are tacked on each other in this order from the spool 50 positioned on the side of the center in the radial direction (corresponding to an upper side shown in FIG. 25 described later) toward an outer side in the radial direction (corresponding to a lower side shown in FIG. 25 described later). Similarly to the above, the print-receiving tape roll 15 includes, for example, the transparent or the translucent print-receiving tape 110 wound around a spool 60. The housing 11A also includes the ink ribbon roll 16 same as above.

The essential portion of this embodiment is the surface shape of the film layer in contact with the adhesive layer in the layer structure of the double-sided adhesive tape 150.

FIG. 25 shows an example where the above is applied to the film layer 151 of the configuration shown in FIG. 5 described above.

In FIG. 25, as described with reference to FIG. 5, the double-sided adhesive tape 150 of this embodiment includes the film layer 151, the adhesive layer 161 disposed in contact with the upper side as shown of the film layer 151 and having the glittering pigment added thereto, the adhesive layer 170 disposed in contact with the lower side as shown of the film layer 151, and the separation material layer 152 disposed in contact with the lower side as shown of the adhesive layer 170 and covering the adhesive layer 170.

This embodiment is characterized in that plural protrusions 151s are disposed on a surface 151a that is in contact with the adhesive layer 161 to which the glittering pigment is added of the film layer 151 (see an enlarged view in FIG. 25).

As schematically shown in FIG. 26A, the adhesive layer 161 to which the pigment is added may as it is have a degraded adhesive force for the film layer 151 in a portion that is in contact with the surface 151a of the film layer 151. Especially, many of the glittering pigment particles P to develop the color for the glittering expression•the pearly expression each usually have a scale-like shape as shown in FIG. 26A. When the relatively large glittering pigment particles P are positioned on the surface (on the lower side in FIG. 26A) of the adhesive layer 161 on the side to be in contact with the film layer 151 and are in contact with the surface 151a of the film layer 151 (for example, see glittering pigment particles Pa shown in FIG. 26A), the adhesive force between the adhesive layer 161 and the film layer 151 is significantly degraded at the above positions. As a result, the adhesive force of the overall adhesive layer 161 is degraded.

In this embodiment, as shown in FIG. 26B, the plural protrusions 151s are disposed on the surface 151a on the side to be in contact with the adhesive layer 161 as above of the film layer 151. In this case, the distance (the interval) L between the two adjacent protrusions 151s, 151s on the surface 151a of the film layer 151 is smaller than a plane distance Lp of one glittering pigment particle P included in the adhesive layer 161 that is in contact with the surface 151a.

As a result, even assuming that the glittering pigment particles P in the adhesive layer 161 are present on the side that is in contact with the film layer 151 as above, the glittering pigment particles P are each blocked by the small intervals between the protrusion 151s and the protrusion 151s of the film layer 151 and, as a result, each cannot enter therebetween (see the glittering pigment particles Pb shown in FIG. 26B). As a result, the film layer 151 and the glittering pigment particles P are not brought into contact with each other in a plane, and the contact area having the adhesive force that is zero can be reduced. The adhesive enters the space between the protrusion 151s and the protrusion 151s and, as a result, the contact area between the film layer 151 and the adhesive layer 161 can be increased. As a result, the adhesive force between the adhesive layer 161 and the film layer 151 can be improved.

The surface roughness of an ordinary PP film without any surface treatment applied thereto is smaller than 0.1 [μm] while the above effect cannot be achieved with the surface roughness at this level. The distance L between the protrusions 151s, 151s is therefore set to be larger than 0.1 [μm] in this embodiment. As a result, the average length (Rsm) of the contour curve elements on the surface 151a of the film layer 151 is smaller than the plane distance Lp and is larger than 0.1 [μm].

Production steps for the double-sided adhesive tape 150 will be described with reference to FIG. 27-FIG. 28.

As shown in FIG. 27, the film layer 151 having the protrusions 151s already formed on the surface 151a is fed out from the film roll FR and is supplied to the adhesive coating head AH. For example, the protrusions 151s only have to formed in advance to satisfy the above condition (0.1 [μm]<L<Lp) by ordinary sand mat processing or ordinary hairline processing on the ordinary film layer 151. Otherwise, a film having the surface roughness satisfying the above condition may be selected from films each originally having recesses and protrusions formed thereon, such as a known coated matte film, a known kneaded matte film, an embossed matte film, and the like, to be used.

The adhesive having the above composition is coated on the face opposite to the face with the surface 151a having the protrusions 151s formed thereon of the supplied film layer 151 by the adhesive coating head AH to establish a two-layer structure of the film layer 151 and the adhesive layer 170. The two-layer structure tape thereafter passes through the first drying chamber D1, the second drying chamber D2, the third drying chamber D3, the fourth drying chamber D4, and the fifth drying chamber D5 in this order and, as a result, the drying process is conducted therefor in the five stages. The number of the drying chambers is not limited to five.

The separation material layer 152 separately fed out from the separation material roll SR is thereafter bonded to the adhesive layer 170 and, as a result, the two-layer structure tape turns into a three-layer structure tape including the film layer 151, the adhesive layer 170, and the separation material layer 152. The three-layer structure tape is thereafter wound in the first tape roll TR1.

As shown in FIG. 28, the three-layer structure tape including the film layer 151, the adhesive layer 170, and the separation material layer 152 is thereafter fed out from the first tape roll TR1 and, similarly to the above, is supplied to the adhesive coating head AH. The adhesive having the above composition (including the glittering pigment) is coated on the face on the side opposite to the side with the adhesive layer 170 of the film layer 151 by the adhesive coating head AH to establish a four-layer structure including the adhesive layer 161 (having the glittering pigment added thereto), the film layer 151, the adhesive layer 170, and the separation material layer 152. Similarly to the above, the tape thereafter sequentially passes through the first to the fifth drying chambers D1-D5 to conduct the drying process therefor to complete the double-sided adhesive tape 150. The double-sided adhesive tape 150 completed in this manner is wound in the second tape roll TR2.

Modification Examples of Third Embodiment

The third embodiment is not limited to the above disclosure and various modifications can be made thereto within the scope not departing from the gist and the technical idea thereof. Modification examples thereof will sequentially be described below.

(3-1) Addition of Pigment Also to Adhesive Layer on Affixation Side

This modification example is an example where the third embodiment is applied to the layer configuration in FIG. 9A described above. FIG. 29A shows the layer configuration of a double-sided adhesive tape 150 of this modification example, corresponding to FIG. 9A.

As show in FIG. 29A, the double-sided adhesive tape 150 of this modification example includes, similarly to FIG. 9A, the transparent film layer 151A that is transparent or translucent (having a transmittance, for example, equal to or greater than 20%), the colored layer 180 disposed in contact with the upper side as shown of the transparent film layer 151A, the adhesive layer 161 disposed in contact with the upper side as shown of the colored layer and having the glittering pigment added thereto, the adhesive layer 170B disposed in contact with the lower side as shown of the transparent film layer 151A and having the glittering pigment added thereto instead of the solid pigment in FIG. 9, and the separation material layer 152 disposed in contact with the lower side as shown of the adhesive layer 170B and covering the adhesive layer 170B.

In this modification example, similarly to the third embodiment, the plural protrusions 151s are disposed on the surface in contact with the adhesive layer 170B to which the glittering pigment is added, of the transparent film layer 151A. Though not shown in detail, the protrusions 151s also satisfy the above condition (0.1 [μm]<L<Lp) in this modification example.

As shown in FIG. 29B, the colored layer 180 between the adhesive layer 161 and the transparent film layer 151A may be removed n the configuration shown in FIG. 29A. In this case, the protrusions 151s are disposed on both of the surface on the upper side as shown in contact with the adhesive layer 161 to which the glittering pigment is added and the surface on the lower side as shown in contact with the adhesive layer 170B to which the glittering pigment is added, of the transparent film layer 151A.

In this modification example, the same advantages as that of the third embodiment is also achieved.

(3-2) Application to Non-Laminate Type Cartridge

In this modification example, different from the third embodiment and the modification example of (3-1) that use the laminate type cartridge 11, the cartridge called what-is-called "non-laminate type" (more particularly, "receptor type") cartridge same as that in the modification example of (2-1) is used.

Though not shown, the cartridge 11 used in this modification example includes, similarly to FIG. 18, inside the housing 11A, the adhesive tape roll 14, the ink ribbon roll 16, the ink ribbon take-up roller 17, and the transporting roller 18. The adhesive tape roll 14 includes the adhesive tape 150N in relation to this modification example wound around the spool 50.

The adhesive tape 150N of this modification example includes, in the cartridge 11, the image-receiving layer 210, the colored layer 180A to which the glittering pigment is added, the transparent film layer 151A that is transparent or translucent (having the transmittance, for example, equal to or greater than 20%), the adhesive layer 161B having the glittering pigment same as above, and the separation material layer 152 that are stacked on each other in this order from the spool 50 positioned on the side of the center in the radial direction (corresponding to the upper side shown in FIG. 30 described later) toward the outer side in the radial direction (corresponding to the lower side shown in FIG. 30 described later). The housing 11A also includes the ink ribbon roll 16 same as above.

This modification example is an example where the third embodiment is applied to the layer configuration in FIG. 23A. FIG. 30 shows the layer configuration of the adhesive tape 150N of this modification example, corresponding to FIG. 23A.

As shown in FIG. 30, the adhesive tape 150N in this modification example includes the transparent film layer 151A, the colored layer 180A disposed in contact with the upper side as shown of the transparent film layer 151A and having the glittering pigment added thereto, the image-receiving layer 210 disposed in contact with the upper side as shown of the colored layer 180A, the adhesive layer 161B disposed in contact with the lower side as shown of the transparent film layer 151A and having the glittering pigment added thereto, and the separation material layer 152 disposed in contact with the lower side as shown of the adhesive layer 161 and covering the adhesive layer 161B.

In this modification example, similarly to the above, the plural protrusions 151s are disposed on the surface in contact with the adhesive layer 161B to which the glittering pigment is added, of the transparent film layer 151A. Though not shown in detail, the protrusions 151s also satisfy the above condition (0.1 [μm]<L<Lp) in this modification example.

Production steps for the adhesive tape 150N will be described with reference to FIG. 31.

As shown in FIG. 31, the transparent film layer 151A having the image-receiving layer 210 and the colored layer 180A already formed thereon using, for example, a known printing technique and having the protrusions 151s already formed on the surface 151a using the same technique as that of the third embodiment is fed out from the film roll FR and is supplied to the adhesive coating head AH. The adhesive having the above composition (including the glittering pigment) is coated on the face opposite to the face with the colored layer 180A of the transparent film layer 151A by the adhesive coating head AH to establish a four-layer structure of the image-receiving layer 210, the colored layer 180A, the transparent film layer 151A, and the adhesive layer 161B (to which the glittering pigment is added). The four-layer structure tape thereafter passes through the first drying chamber D1, the second drying chamber D2, the third drying chamber D3, the fourth drying chamber D4, and the fifth drying chamber D5 in this order to conduct the drying process therefor in the five stages. The separation material layer 152 separately fed out from the separation material roll SR is thereafter bonded to the adhesive layer 161 and, as a result, the four-layer structure tape turns into a five-layer structure adhesive tape 150N is completed including the image-receiving layer 210, the colored layer 180A, the transparent film layer 151A, the adhesive layer 161B, and the separation material layer 152. The adhesive tape 150N completed in this manner is wound in the first tape roll TR1.

In this modification example, the same advantages as that of the third embodiment is also achieved.

(3-3) Case where Protrusions are Disposed on Colored Layer

In the configuration shown in FIG. 29A, protrusions each having the same shape as that of the protrusion 151s of the film layer 151, may be disposed on the surface on the side of the adhesive layer 161 of the colored layer 180. FIG. 32 shows such a modification example.

In this case, as shown in FIG. 32, the double-sided adhesive tape 150 includes the transparent film layer 151A having the transmittance, for example, equal to or greater than 20% and including the protrusions 151s, the colored layer 180 disposed in contact with the upper side as shown of the transparent film layer 151A, the adhesive layer 161 disposed in contact with the upper side as shown of the colored layer and having the glittering pigment added thereto, the adhesive layer 170B disposed in contact with the lower side as shown of the transparent film layer 151A, and the separation material layer 152 disposed in contact with the lower side as shown of the adhesive layer 170B and covering the adhesive layer 170B.

In this modification example, plural protrusions 180s are disposed on the surface 180a that is in contact with the adhesive layer 161 to which the glittering pigment is added, of the colored layer 180. Similarly to the protrusions 151s, the distance L between the two adjacent protrusions 180s, 180s is smaller than the plane distance Lp of the one glittering pigment particle P included in the adhesive layer 161 to be in contact with the surface 180a, and is larger than 0.1 [μm]. As a result, the average length (Rsm) of the contour curve elements on the surface 181a of the colored layer 180 is smaller than the plane distance Lp thereon, and is larger than 0.1 [μm].

Similarly to the protrusions 151s, for the protrusions 180s of the colored layer 180 in this modification example, even assuming that the glittering pigment particles P in the adhesive layer 161 are present on the side that is in contact with the colored layer 180, the glittering pigment particles P are each blocked by the small interval between the protrusion 180s and the protrusion 151s of the colored layer 180 and, as a result, each cannot enter therebetween. As a result, the colored layer 180 and the glittering pigment particles P are not brought into contact with each other in a plane, and the contact area having the adhesive force that is zero can be reduced. The adhesive enters the space between the protrusion 180s and the protrusion 180s and, as a result, the contact area between the colored layer 180 and the adhesive layer 161 can be increased. As a result, the adhesive force between the adhesive layer 161 and the colored layer 180 can be improved.

(4) Others

When the value of each of the various parameters in relation to the tape (the volume ratio, the average particle diameter, the adhesive force, and all other parameters) is measured in all the embodiments and the modification examples described above, a piece equal to or larger than 10 mm×10 mm is cut off from the tape and the measurement is conducted using this piece.

In addition to the above, the techniques on the basis of the embodiments and the modification examples may properly be used in combination.

What is claimed is:

1. An adhesive tape cartridge comprising
an adhesive tape roll that winds an adhesive tape around a predetermined axis in a housing,
said adhesive tape comprising:
a base layer;
a colored layer that is disposed on a first side of said base layer in a thickness direction and comprises a pigment added thereto;
a pigment-containing adhesive layer that is disposed on said first side of said colored layer in the thickness direction and comprises an adhesive to which a pigment is added;
an affixing adhesive layer disposed on a second side of said base layer in the thickness direction; and
a separation material layer disposed on said second side of said affixing adhesive layer in the thickness direction.

2. The adhesive tape cartridge according to claim 1, wherein
a thickness of said pigment-containing adhesive layer is larger than a thickness of said affixing adhesive layer.

3. An adhesive tape cartridge comprising:
an adhesive tape roll that winds an adhesive tape around a predetermined axis in a housing,
said adhesive tape comprising:
a base layer;
a colored layer that is disposed on a first side of said base layer in a thickness direction and comprises a pigment added thereto; and
a pigment-containing adhesive layer that is disposed on said first side of said colored layer in the thickness direction and comprises an adhesive to which a pigment is added;
said housing comprising:
a cover film roll that winds a cover film bonded on said first side of said pigment-containing adhesive layer of said adhesive tape in the thickness direction, and
an ink ribbon roll that winds an ink ribbon configured to transfer ink to a second side of said cover film in the thickness direction, the cover film being fed out from said cover film roll.

4. An adhesive tape cartridge comprising:
an adhesive tape roll that winds an adhesive tape around a predetermined axis in a housing, and
an ink ribbon roll that winds an ink ribbon configured to transfer ink to said adhesive tape in said housing,
said adhesive tape comprising:
a base layer that has a transmittance of 20% or more;
a pigment-containing adhesive layer that is disposed on a first side of said base layer in a thickness direction and comprises an adhesive to which a pigment is added; and
a colored layer that is disposed on a second side of said base layer in the thickness direction and comprises a pigment added thereto.

5. The adhesive tape cartridge according to claim 4, wherein
said adhesive tape further comprises a separation material layer disposed on said first side of said pigment-containing adhesive layer in the thickness direction.

6. The adhesive tape cartridge according to claim 4, wherein
a thickness of said pigment-containing adhesive layer is 15 μm or more and 50 μm or less.

7. The adhesive tape cartridge according to claim 6, wherein
the thickness of said pigment-containing adhesive layer is larger than a thickness of said colored layer.

8. The adhesive tape cartridge according to claim 4, wherein
a volume proportion of said pigment in said pigment-containing adhesive layer is 1% or more and 40% or less.

9. The adhesive tape cartridge according to claim 8, wherein
the volume proportion of said pigment in said pigment-containing adhesive layer is smaller than the volume proportion of said pigment in said colored layer.

10. The adhesive tape cartridge according to claim 4, wherein
said pigment in said pigment-containing adhesive layer has an average particle diameter of 5 μm or more and 200 μm or less.

11. The adhesive tape cartridge according to claim 10, wherein
the average particle diameter of said pigment in said pigment-containing adhesive layer is larger than an average particle diameter of said pigment in said colored layer.

12. The adhesive tape cartridge according to claim 4, wherein
said pigment of said pigment-containing adhesive layer has a transmittance of 20% or more.

13. The adhesive tape cartridge according to claim 4, wherein
the affixing adhesive layer or the pigment-containing adhesive layer covered by a separation material layer has an adhesive force of 3 [N]/10 [mm] or more.

14. The adhesive tape cartridge according to claim 4, wherein
a solid pigment is further added to said colored layer.

15. An adhesive tape cartridge comprising:
an adhesive tape roll that winds an adhesive tape around a predetermined axis in a housing, said adhesive tape comprising:
a base layer that has a transmittance of 20% or more;
a pigment-containing adhesive layer that is disposed on a first side of said base layer in a thickness direction and comprises an adhesive to which a pigment is added; and
a colored layer that is disposed on a second side of said base layer in the thickness direction and comprises a pigment added thereto,
wherein said pigment added to said colored layer and said pigment-containing adhesive layer is a glittering pigment.

16. The adhesive tape cartridge according to claim 15, wherein
said adhesive tape further comprises an ink image receiving layer that has a transmittance of 20% or more, is disposed on said second side of said colored layer in the thickness direction, and is configured to receive transfer of ink.

\* \* \* \* \*